(12) United States Patent
Gregg et al.

(10) Patent No.: US 9,431,944 B2
(45) Date of Patent: Aug. 30, 2016

(54) ELECTRICITY GENERATOR

(75) Inventors: John Francis Gregg, Greystones (IE); Mazhar Ali Bari, Dublin (IE)

(73) Assignee: ISIS Innovation LTD, Oxford (GB)

( * ) Notice: Subject to any disclaimer, the term of this patent is extended or adjusted under 35 U.S.C. 154(b) by 1127 days.

(21) Appl. No.: 12/865,559

(22) PCT Filed: Feb. 2, 2009

(86) PCT No.: PCT/GB2009/000307
§ 371 (c)(1), (2), (4) Date: Aug. 30, 2010

(87) PCT Pub. No.: WO2009/095702
PCT Pub. Date: Aug. 6, 2009

(65) Prior Publication Data
US 2010/0329652 A1 Dec. 30, 2010

(30) Foreign Application Priority Data
Feb. 1, 2008 (GB) .................................. 0801936.6

(51) Int. Cl.
*H05B 3/78* (2006.01)
*H02P 9/04* (2006.01)
(Continued)

(52) U.S. Cl.
CPC .............. *H02P 9/46* (2013.01); *F03D 7/0272* (2013.01); *F03D 9/002* (2013.01); *F03D 9/006* (2013.01);
(Continued)

(58) Field of Classification Search
CPC ...... F03D 9/002; F03D 9/003; F03D 7/0204; F03D 7/042; F03D 7/00; F03D 7/0276; F03D 7/04; F03D 9/005; F03D 7/0272; F03D 9/006; H02J 3/386; Y02E 10/723; Y02E 10/725; H02P 2101/15; H02P 9/30; H02P 9/46; Y02B 10/30; Y02B 10/70
USPC ..... 392/497; 290/39, 40 A, 44, 55; 415/905, 415/607; 60/398, 413–418
See application file for complete search history.

(56) References Cited

U.S. PATENT DOCUMENTS 2,178,679 A * 11/1939 Claytor ........................... 290/44
2,758,272 A *  8/1956 Franklin ........................ 322/47
(Continued)

FOREIGN PATENT DOCUMENTS

GB                 405234 A        2/1934

OTHER PUBLICATIONS

International Search Report dated May 14, 2009, issued in PCT Application No. PCT/GB2009/000307 filed Feb. 2, 2009.
(Continued)

*Primary Examiner* — Eric Stapleton
(74) *Attorney, Agent, or Firm* — Workman Nydegger

(57) ABSTRACT

A wind turbine and generator arrangement comprises a turbine that drives a self-excited induction generator via a shaft and mechanical gearbox. The induction generator includes an electrical circuit that includes a variable capacitance and a variable resistance. The variable capacitance may be constituted by a fixed capacitor and a triac under the control of a controller, or by a bank of capacitors switched by a relay under control of the controller. The variable resistance includes a triac controlled resistor or a bank of relay-switched resistors which constitute heating elements for heating domestic hot water. In use the generator frequency and voltage are allowed to 'float' while the optimal generator power output is maintained, but adjusting the impedance of the electrical circuit as the wind speed varies.

4 Claims, 17 Drawing Sheets

(51) Int. Cl.
*H05B 3/00* (2006.01)
*H02P 9/46* (2006.01)
*F03D 7/02* (2006.01)
*F03D 9/00* (2016.01)
*H02P 9/30* (2006.01)
*H02P 101/15* (2015.01)

(52) U.S. Cl.
CPC ............ *H02P 9/30* (2013.01); *H02P 2101/15* (2015.01); *Y02B 10/30* (2013.01); *Y02B 10/70* (2013.01); *Y02E 10/723* (2013.01); *Y02E 10/725* (2013.01)

(56) References Cited

U.S. PATENT DOCUMENTS

| | | | | |
|---|---|---|---|---|
| 2,871,439 | A * | 1/1959 | Shaw | 322/47 |
| 3,043,115 | A * | 7/1962 | Harter | 62/236 |
| 3,854,032 | A * | 12/1974 | Cooper | 219/383 |
| 4,242,628 | A * | 12/1980 | Mohan et al. | 322/35 |
| 4,274,010 | A * | 6/1981 | Lawson-Tancred | 290/55 |
| 4,357,542 | A * | 11/1982 | Kirschbaum | 290/44 |
| 4,371,828 | A * | 2/1983 | Tornatore et al. | 322/32 |
| 4,384,246 | A * | 5/1983 | Larsen et al. | 322/58 |
| 4,388,585 | A * | 6/1983 | Nola | 322/47 |
| 4,417,194 | A * | 11/1983 | Curtiss et al. | 322/47 |
| 4,421,967 | A * | 12/1983 | Birgel et al. | 219/631 |
| 4,438,341 | A * | 3/1984 | Winterbotham | 290/44 |
| 4,450,364 | A * | 5/1984 | Benoit | 290/55 |
| 4,486,638 | A * | 12/1984 | de Bennetot | 219/631 |
| 4,677,364 | A * | 6/1987 | Williams et al. | 322/47 |
| 4,680,720 | A * | 7/1987 | Yoshii et al. | 345/472 |
| 4,836,145 | A * | 6/1989 | Ronchi | 122/4 A |
| 4,990,745 | A * | 2/1991 | Bayles et al. | 392/386 |
| 5,105,096 | A * | 4/1992 | Waldschmidt et al. | 307/68 |
| 5,265,318 | A * | 11/1993 | Shero | 29/447 |
| 5,525,894 | A * | 6/1996 | Heller | 322/20 |
| 5,532,918 | A * | 7/1996 | Mayrand et al. | 363/89 |
| 5,929,612 | A * | 7/1999 | Eisenhaure et al. | 322/47 |
| 5,949,958 | A * | 9/1999 | Naperkowski et al. | 392/399 |
| 5,986,438 | A * | 11/1999 | Wallace et al. | 322/20 |
| 6,020,725 | A * | 2/2000 | Roberts | 322/90 |
| 6,137,187 | A * | 10/2000 | Mikhail et al. | 290/44 |
| 6,163,137 | A * | 12/2000 | Wallace et al. | 322/20 |
| 6,420,795 | B1 * | 7/2002 | Mikhail et al. | 290/44 |
| 6,600,240 | B2 * | 7/2003 | Mikhail et al. | 307/85 |
| 6,700,214 | B2 * | 3/2004 | Ulinski et al. | 290/40 C |
| 6,703,793 | B2 * | 3/2004 | Kitano | 315/224 |
| 6,748,904 | B1 * | 6/2004 | Chiang | 122/40 |
| 6,765,309 | B2 * | 7/2004 | Tallal et al. | 290/55 |
| 6,788,031 | B2 * | 9/2004 | Pendell | 322/44 |
| 6,847,128 | B2 * | 1/2005 | Mikhail et al. | 290/44 |
| 6,856,039 | B2 * | 2/2005 | Mikhail et al. | 290/44 |
| 6,924,627 | B1 * | 8/2005 | Wobben | 322/20 |
| 6,943,462 | B2 * | 9/2005 | Wobben | 290/44 |
| 6,954,004 | B2 * | 10/2005 | Skeist et al. | 290/44 |
| 6,984,897 | B2 * | 1/2006 | Skeist et al. | 290/44 |
| 7,061,133 | B1 * | 6/2006 | Leijon et al. | 290/44 |
| 7,095,131 | B2 * | 8/2006 | Mikhail et al. | 290/44 |
| 7,577,343 | B2 * | 8/2009 | Chiang | 392/399 |
| RE41,073 | E * | 1/2010 | Wobben | 290/44 |
| 7,646,178 | B1 * | 1/2010 | Fradella | 322/46 |
| 7,801,424 | B2 * | 9/2010 | Cheung | 392/399 |
| 8,125,095 | B2 * | 2/2012 | Duffey et al. | 290/44 |
| 8,198,742 | B2 * | 6/2012 | Jorgensen et al. | 290/44 |
| 2002/0105189 | A1 * | 8/2002 | Mikhail et al. | 290/44 |
| 2004/0094964 | A1 * | 5/2004 | Mikhail et al. | 290/44 |
| 2004/0183310 | A1 | 9/2004 | Mowll | |
| 2004/0207208 | A1 * | 10/2004 | Mikhail et al. | 290/44 |
| 2004/0257832 | A1 * | 12/2004 | Skeist et al. | 363/1 |
| 2004/0263110 | A1 * | 12/2004 | Pendell | 318/794 |
| 2005/0012487 | A1 * | 1/2005 | Skeist et al. | 318/727 |
| 2005/0253396 | A1 * | 11/2005 | Mikhail et al. | 290/44 |
| 2006/0132103 | A1 * | 6/2006 | Baratto et al. | 322/17 |
| 2007/0223894 | A1 * | 9/2007 | Cheung | 392/405 |
| 2011/0280553 | A1 * | 11/2011 | Hsu | 392/394 |

OTHER PUBLICATIONS

Written Opinion dated May 14, 2009, issued in PCT Application No. PCT/GB2009/000307 filed Feb. 2, 2009.
Chinese Office Action dated Apr. 26, 2012, issued in Application No. 200980103738.8.
Chinese Office Action dated Jul. 31, 2012, issued in Application No. 200980103738.8.
Indian Examination Report dated Jul. 30, 2015, issued in Indian Application No. 2916/KOLNP/2010, filed Aug. 9, 2010.

* cited by examiner

| Type Test Report | Cert. No. A3,0859 |
| --- | --- |
| | Date of Issue: |

| Customer: | Type: | M2AA 132 M-4 |
| --- | --- | --- |
| | Serial no: | |
| Customer ref: | Order no: | |

| Rating data: | | V | Hz | r/min | kW | Hp | A | cos φ |
| --- | --- | --- | --- | --- | --- | --- | --- | --- |
| Prod.code 3GAA 132002-BDA | | 660-690Y | 50 | 1450 | 7,5 | | 8,8 | 0.83 |
| class F  IP 55  kg | | 380-420D | 50 | 1450 | 7,5 | | 15,3 | 0.83 |
| | | 440-460D | 50 | 1750 | 5,6 | | 15,1 | 0.83 |

| Test | Pole | U(V) | r(Hz) | 1(A) | P1(Kw) | P2(Kw) | n(s/min) | cos φ | η (%) |
| --- | --- | --- | --- | --- | --- | --- | --- | --- | --- |
| Temp-rise test  3.5 h | 4 | 4 | 50 | 14,8 | 8,67 | 7,52 | 1450 | 0.845 | 0.845 |
| No-load test | | 400 | 50 | 6,1 | 0,374 | | 1500 | 0.089 | |
| Locked-Rotor test | | 110 | 50 | 19,4 | 1,942 | | 0 | 0,525 | |
| Temp-rise test  h | 0 | | | | | | | | |
| No-load test | | | | | | | | | |
| Locked-Rotor test | | | | | | | 0 | | |

| Resistance  Pole  Ambient 20 °c | Insulation resistance | High Voltage test | Overload test |
| --- | --- | --- | --- |
| Line  4  1,27113 Ω/TE | R  2000 M.ohm | 2320  60s | Volts 0,3  60s |
| Line  0  Ω/TE | | | Amp  0,6  120s |
| | | | r/min 0,2  120s |

| Temperature rise  Pole  K  Method | Temperature  Pole  C  Method | Measurement method |
| --- | --- | --- |
| Winding  4  73,1  1 | Ambient  4  24,2  2 | 1 Resistance |
| Winding  0 | Frame  38,3  2 | 2 Thermometer |
| | Bearing D-end  51,3  2 | 3 Thermocouples |
| | Ambient  0 | |
| | Frame | |
| | Bearing D-end | |

Type test on motor 3gaa132002    which is identical in all respects with the above No.

Manufactured and tested in accordance with the rules of
IEC 34-1

| On behalf of customer | |
| --- | --- |
| On behalf of manufacturer | |
| Tested by     Date of test  931228 | |

FIG. 13

| | | | | |
|---|---|---|---|---|
| C PAR =80. UF | C PAR =80. UF | C PAR =80. UF | C PAR =81. UF | C PAR =81. UF |
| R PAR =100. | R PAR =100. | R PAR =100. | R PAR =100. | R PAR =100. |
| C SER =93. UF | C SER =96. UF | C SER =101. UF | C SER =107. UF | C SER =117. UF |
| R PAR =14. | R PAR =17. | R PAR =20. | R PAR =25. | R PAR =31. |
| MECH FREQ =50. | MECH FREQ =45. | MECH FREQ =40. | MECH FREQ =35. | MECH FREQ =30. |
| ELEC FREQ =49. | ELEC FREQ =44. | ELEC FREQ =39. | ELEC FREQ =34. | ELEC FREQ =29. |
| ELEC POWER =8,427. | ELEC POWER =6,138 | ELEC POWER =4,266. | ELEC POWER =2,638. | ELEC POWER =339. |
| MECH POWER =9,594. | MECH POWER =6,981. | MECH POWER =4,854. | MECH POWER =3,001. | MECH POWER =385. |
| TORQUE =31. | TORQUE =25. | TORQUE =19. | TORQUE =14. | TORQUE =2. |
| S=-0.0183 | S=-0.0183 | S=-0.0183 | S=-0.0183 | S=-0.0183 |
| V=530. | V=452. | V=377. | V=297. | V=106. |

| | | | | |
|---|---|---|---|---|
| C PAR =80. UF | C PAR =80. UF | C PAR =81. UF | C PAR =81. UF | |
| R PAR =100. | R PAR =100. | R PAR =100. | R PAR =100. | |
| C SER =94. UF | C SER =97. UF | C SER =102. UF | C SER =109. UF | |
| R PAR =15. | R PAR =17. | R PAR =21. | R PAR =26. | |
| MECH FREQ =49. | MECH FREQ =44 | MECH FREQ =39. | MECH FREQ =34. | |
| ELEC FREQ =48. | ELEC FREQ =43. | ELEC FREQ =38. | ELEC FREQ =33. | |
| ELEC POWER =7,919. | ELEC POWER =5,739. | ELEC POWER =3,931. | ELEC POWER =2,323. | |
| MECH POWER =9,010. | MECH POWER =6,528. | MECH POWER =4,472. | MECH POWER =2,643. | |
| TORQUE =29. | TORQUE =24. | TORQUE =18. | TORQUE =12. | |
| S=-0.0183 | S=-0.0183 | S=-0.0183 | S=-0.0183 | |
| V=514. | V=437. | V=362. | V=278. | |

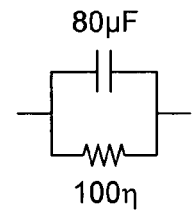

80μF
100η

| | | | |
|---|---|---|---|
| C PAR =80. UF | C PAR =80. UF | C PAR =80. UF | C PAR =81. UF |
| R PAR =100. | R PAR =100. | R PAR =100. | R PAR =100. |
| C SER =95. UF | C SER =98. UF | C SER =103. UF | C SER =111. UF |
| R PAR =15. | R PAR =18. | R PAR =22. | R PAR =27. |
| MECH FREQ =48. | MECH FREQ =43. | MECH FREQ =38. | MECH FREQ =33. |
| ELEC FREQ =47. | ELEC FREQ =42. | ELEC FREQ =37. | ELEC FREQ =32. |
| ELEC POWER =7,470. | ELEC POWER =5,359. | ELEC POWER =3,588. | ELEC POWER =1,996. |
| MECH POWER =8,497. | MECH POWER =6,095. | MECH POWER =4,892. | MECH POWER =2,272. |
| TORQUE =28. | TORQUE =23. | TORQUE =17. | TORQUE =11. |
| S=-0.0183 | S=-0.0183 | S=-0.0183 | S=-0.0183 |
| V=499. | V=423. | V=346. | V=258. |

| | | | |
|---|---|---|---|
| C PAR =80. UF | C PAR =81. UF | C PAR =81. UF | C PAR =81. UF |
| R PAR =100. | R PAR =100. | R PAR =100. | R PAR =100. |
| C SER =95. UF | C SER =99. UF | C SER =104. UF | C SER =113. UF |
| R PAR =16. | R PAR =19. | R PAR =23. | R PAR =28. |
| MECH FREQ =47. | MECH FREQ =42. | MECH FREQ =37. | MECH FREQ =32. |
| ELEC FREQ =46. | ELEC FREQ =41. | ELEC FREQ =36. | ELEC FREQ =31. |
| ELEC POWER =7,001. | ELEC POWER =4,995. | ELEC POWER =3,269. | ELEC POWER =1,661. |
| MECH POWER =7,963. | MECH POWER =5,681. | MECH POWER =3,719. | MECH POWER =1,890. |
| TORQUE =27. | TORQUE =22. | TORQUE =16. | TORQUE =9. |
| S=-0.0183 | S=-0.0183 | S=-0.0183 | S=-0.0183 |
| V=483. | V=408. | V=338. | V=235. |

| | | | |
|---|---|---|---|
| C PAR =80. UF | C PAR =80. UF | C PAR =80. UF | C PAR =81. UF |
| R PAR =100. | R PAR =100. | R PAR =100. | R PAR =100. |
| C SER =96. UF | C SER =100. UF | C SER =106. UF | C SER =115. UF |
| R PAR =16. | R PAR =20. | R PAR =24. | R PAR =30. |
| MECH FREQ =46. | MECH FREQ =41. | MECH FREQ =36. | MECH FREQ =31. |
| ELEC FREQ =45. | ELEC FREQ =40. | ELEC FREQ =35. | ELEC FREQ =30. |
| ELEC POWER =6,557. | ELEC POWER =4,613. | ELEC POWER =2,945. | ELEC POWER =1,259. |
| MECH POWER =7,457. | MECH POWER =5,249. | MECH POWER =3,350. | MECH POWER =1,433. |
| TORQUE =26. | TORQUE =20. | TORQUE =15. | TORQUE =7. |
| S=-0.0183 | S=-0.0183 | S=-0.0183 | S=-0.0183 |
| V=467. | V=392. | V=313. | V=205. |

FIG. 14

| | | | | |
|---|---|---|---|---|
| C PAR =80. UF<br>R PAR =149.<br>C SER =85. UF<br>R PAR =10.<br>MECH FREQ =50.<br>ELEC FREQ =49.<br>ELEC POWER =5,710.<br>MECH POWER =6,665.<br>TORQUE =21.<br>S=-0.0128<br>V=534. | C PAR =80. UF<br>R PAR =150.<br>C SER =87. UF<br>R PAR =12.<br>MECH FREQ =45.<br>ELEC FREQ =44.<br>ELEC POWER =4,188<br>MECH POWER =4,853.<br>TORQUE =17.<br>S=-0.0128<br>V=458. | C PAR =80. UF<br>R PAR =150.<br>C SER =89. UF<br>R PAR =15.<br>MECH FREQ =40.<br>ELEC FREQ =39.<br>ELEC POWER =2,916.<br>MECH POWER =3,379.<br>TORQUE =13.<br>S=-0.0128<br>V=382. | C PAR =81. UF<br>R PAR =150.<br>C SER =92. UF<br>R PAR =19.<br>MECH FREQ =35.<br>ELEC FREQ =35.<br>ELEC POWER =1,827.<br>MECH POWER =2,118.<br>TORQUE =10.<br>S=-0.0128<br>V=302. | C PAR =81. UF<br>R PAR =150.<br>C SER =97. UF<br>R PAR =25.<br>MECH FREQ =30.<br>ELEC FREQ =30.<br>ELEC POWER =64.<br>MECH POWER =74.<br>TORQUE =4.<br>S=-0.0128<br>V=179. |
| C PAR =81. UF<br>R PAR =150.<br>C SER =87. UF<br>R PAR =10.<br>MECH FREQ =49.<br>ELEC FREQ =48.<br>ELEC POWER =5,412.<br>MECH POWER =6,272.<br>TORQUE =20.<br>S=-0.0128<br>V=520. | C PAR =80. UF<br>R PAR =150.<br>C SER =88. UF<br>R PAR =13.<br>MECH FREQ =44<br>ELEC FREQ =43.<br>ELEC POWER =3,917.<br>MECH POWER =4,539.<br>TORQUE =16.<br>S=-0.0128<br>V=443. | C PAR =80. UF<br>R PAR =150.<br>C SER =90. UF<br>R PAR =16.<br>MECH FREQ =39.<br>ELEC FREQ =39.<br>ELEC POWER =2,689.<br>MECH POWER =3,116.<br>TORQUE =13.<br>S=-0.0128<br>V=367. | C PAR =81. UF<br>R PAR =150.<br>C SER =93. UF<br>R PAR =20.<br>MECH FREQ =34.<br>ELEC FREQ =34.<br>ELEC POWER =1,620.<br>MECH POWER =1,877.<br>TORQUE =9.<br>S=-0.0128<br>V=285. | 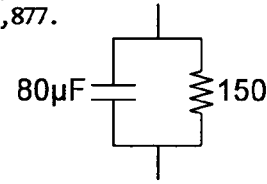 |
| C PAR =81. UF<br>R PAR =150.<br>C SER =87. UF<br>R PAR =11.<br>MECH FREQ =48.<br>ELEC FREQ =47.<br>ELEC POWER =5,082.<br>MECH POWER =5,889.<br>TORQUE =20.<br>S=-0.0128<br>V=504. | C PAR =81. UF<br>R PAR =150.<br>C SER =88. UF<br>R PAR =13.<br>MECH FREQ =43.<br>ELEC FREQ =42.<br>ELEC POWER =3,656.<br>MECH POWER =4,237.<br>TORQUE =16.<br>S=-0.0128<br>V=428. | C PAR =81. UF<br>R PAR =150.<br>C SER =91. UF<br>R PAR =16.<br>MECH FREQ =38.<br>ELEC FREQ =38.<br>ELEC POWER =2,470.<br>MECH POWER =2,862.<br>TORQUE =12.<br>S=-0.0128<br>V=351. | C PAR =81. UF<br>R PAR =150.<br>C SER =94. UF<br>R PAR =21.<br>MECH FREQ =33.<br>ELEC FREQ =33.<br>ELEC POWER =1,413.<br>MECH POWER =1,638.<br>TORQUE =8.<br>S=-0.0128<br>V=266. | |
| C PAR =80. UF<br>R PAR =150.<br>C SER =87. UF<br>R PAR =11.<br>MECH FREQ =47.<br>ELEC FREQ =46.<br>ELEC POWER =4,768.<br>MECH POWER =5,526.<br>TORQUE =19.<br>S=-0.0128<br>V=438. | C PAR =81. UF<br>R PAR =150.<br>C SER =89. UF<br>R PAR =14.<br>MECH FREQ =42.<br>ELEC FREQ =41.<br>ELEC POWER =3,405.<br>MECH POWER =3,946.<br>TORQUE =15.<br>S=-0.0128<br>V=413. | C PAR =80. UF<br>R PAR =150.<br>C SER =91. UF<br>R PAR =17.<br>MECH FREQ =37.<br>ELEC FREQ =37.<br>ELEC POWER =2,247.<br>MECH POWER =2,604.<br>TORQUE =11.<br>S=-0.0128<br>V=335. | C PAR =81. UF<br>R PAR =150.<br>C SER =95. UF<br>R PAR =22.<br>MECH FREQ =32.<br>ELEC FREQ =32.<br>ELEC POWER =1,194.<br>MECH POWER =1,384.<br>TORQUE =7.<br>S=-0.0128<br>V=244. | |
| C PAR =80. UF<br>R PAR =150.<br>C SER =87. UF<br>R PAR =12.<br>MECH FREQ =46.<br>ELEC FREQ =45.<br>ELEC POWER =4,471.<br>MECH POWER =5,182.<br>TORQUE =18.<br>S=-0.0128<br>V=473. | C PAR =80. UF<br>R PAR =150.<br>C SER =89. UF<br>R PAR =14.<br>MECH FREQ =41.<br>ELEC FREQ =40.<br>ELEC POWER =3,151.<br>MECH POWER =3,652.<br>TORQUE =14.<br>S=-0.0128<br>V=397. | C PAR =81. UF<br>R PAR =150.<br>C SER =92. UF<br>R PAR =18.<br>MECH FREQ =36.<br>ELEC FREQ =36.<br>ELEC POWER =2,039.<br>MECH POWER =2,363.<br>TORQUE =10.<br>S=-0.0128<br>V=319. | C PAR =81. UF<br>R PAR =150.<br>C SER =96. UF<br>R PAR =23.<br>MECH FREQ =31.<br>ELEC FREQ =31.<br>ELEC POWER =960.<br>MECH POWER =1,113.<br>TORQUE =6.<br>S=-0.0128<br>V=219. | FIG. 15 |

```
C PAR =42. UF          C PAR =46. UF          C PAR =51. UF              39η  85μF
R PAR =77.             R PAR =86.             R PAR =97.                 ─WW─┤├─
C SER =85. UF          C SER =85. UF          C SER =85. UF
R PAR =39.             R PAR =39.             R PAR =39.
MECH FREQ =50.         MECH FREQ =45.         MECH FREQ =40.
ELEC FREQ =49.         ELEC FREQ =44.         ELEC FREQ =39.
ELEC POWER =6,838.     ELEC POWER =4,423.     ELEC POWER =2,423.
MECH POWER =7,741.     MECH POWER =5,008.     MECH POWER =2,755.
TORQUE =25.            TORQUE =18.            TORQUE =11.
S=-0.0233              S=-0.0211              S=-0.0188
V=418.                 V=355.                 V=280.

C PAR =42. UF          C PAR =47. UF          C PAR =52. UF
R PAR =78.             R PAR =88.             R PAR =100.
C SER =85. UF          C SER =85. UF          C SER =85. UF
R PAR =39.             R PAR =39.             R PAR =39.
MECH FREQ =49.         MECH FREQ =44          MECH FREQ =39.
ELEC FREQ =48.         ELEC FREQ =43.         ELEC FREQ =38.
ELEC POWER =6,188.     ELEC POWER =4,021.     ELEC POWER =2,038.
MECH POWER =7,007.     MECH POWER =4,552.     MECH POWER =2,311.
TORQUE =23.            TORQUE =16.            TORQUE =9.
S=-0.0229              S=-0.0287              S=-0.0183
V=482.                 V=342.                 V=261.

C PAR =43. UF          C PAR =48. UF          C PAR =53. UF
R PAR =88.             R PAR =90.             R PAR =103.
C SER =85. UF          C SER =85. UF          C SER =85. UF
R PAR =39.             R PAR =39.             R PAR =39.
MECH FREQ =48.         MECH FREQ =43.         MECH FREQ =38.
ELEC FREQ =47.         ELEC FREQ =42.         ELEC FREQ =37.
ELEC POWER =5,734.     ELEC POWER =3,563.     ELEC POWER =1,613.
MECH POWER =6,495.     MECH POWER =4,072.     MECH POWER =1,837.
TORQUE =22.            TORQUE =15.            TORQUE =8.
S=-0.0225              S=-0.0203              S=-0.0178
V=391.                 V=327.                 V=236.

C PAR =44. UF          C PAR =49. UF          C PAR =55. UF
R PAR =82.             R PAR =92.             R PAR =187.
C SER =85. UF          C SER =85. UF          C SER =85. UF
R PAR =39.             R PAR =39.             R PAR =39.
MECH FREQ =47.         MECH FREQ =42.         MECH FREQ =37.
ELEC FREQ =46.         ELEC FREQ =41.         ELEC FREQ =36.
ELEC POWER =5,279.     ELEC POWER =3,194.     ELEC POWER =1,074.
MECH POWER =5,978.     MECH POWER =3,631.     MECH POWER =1,225.
TORQUE =20.            TORQUE =14.            TORQUE =5.
S=-0.0220              S=-0.0198              S=-0.0173
V=379.                 V=313.                 V=196.

C PAR =45. UF          C PAR =50. UF          C PAR =55. UF
R PAR =84.             R PAR =95.             R PAR =109.
C SER =85. UF          C SER =85. UF          C SER =85. UF
R PAR =39.             R PAR =39.             R PAR =39.
MECH FREQ =46.         MECH FREQ =41.         MECH FREQ =37.(36.5)
ELEC FREQ =45.         ELEC FREQ =40.         ELEC FREQ =36.(35.5)
ELEC POWER =4,843.     ELEC POWER =2,823.     ELEC POWER =68.
MECH POWER =5,483.     MECH POWER =3,218.     MECH POWER =77.
TORQUE =19.            TORQUE =13.            TORQUE =3.E-1
S=-0.0216              S=-0.0193              S=-0.0170
V=367.                 V=298.                 V=50.        FIG. 17
```

C PAR =42. UF
R PAR =77.
C SER =85. UF
R PAR =39.
MECH FREQ =50.
ELEC FREQ =49.
ELEC POWER =6,807.
MECH POWER =7,746.
TORQUE =25.
S=-0.0233
V=418.

C PAR =42. UF
R PAR =78.
C SER =86. UF
R PAR =39.
MECH FREQ =49.
ELEC FREQ =48.
ELEC POWER =6,258.
MECH POWER =7,100.
TORQUE =23.
S=-0.0233
V=401.

C PAR =43. UF
R PAR =77.
C SER =88. UF
R PAR =40.
MECH FREQ =48.
ELEC FREQ =47.
ELEC POWER =5,726.
MECH POWER =6,499.
TORQUE =22.
S=-0.0223
V=383.

C PAR =43. UF
R PAR =77.
C SER =90. UF
R PAR =40.
MECH FREQ =47.
ELEC FREQ =46.
ELEC POWER =5,080.
MECH POWER =5,772.
TORQUE =20.
S=-0.0233
V=361.

C PAR =43. UF
R PAR =77.
C SER =92. UF
R PAR =41.
MECH FREQ =46.
ELEC FREQ =45.
ELEC POWER =4,406.
MECH POWER =5,085.
TORQUE =17.
S=-0.0233
V=336.

C PAR =43. UF
R PAR =77.
C SER =94. UF
R PAR =42.
MECH FREQ =45.
ELEC FREQ =44.
ELEC POWER =3,680.
MECH POWER =4,182.
TORQUE =15.
S=-0.0233
V=307.

C PAR =43. UF
R PAR =77.
C SER =97. UF
R PAR =43.
MECH FREQ =44.
ELEC FREQ =43.
ELEC POWER =2,658.
MECH POWER =3,012.
TORQUE =11.
S=-0.0233
V=261.

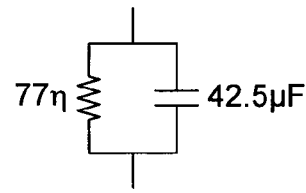

FIG. 18

ELECTRICITY GENERATOR

BACKGROUND OF THE INVENTION

Asynchronous or induction generators have for some time formed the basis for the generation of electricity from wind turbines. They are attractive because of their relative simplicity, inexpensiveness and ruggedness. Various types of induction generators are known but all operate on the same basic principle: a prime mover (such as a turbine blade) delivers mechanical power to rotate a rotor, which rotates in the vicinity of the excited primary windings of a stator. In order to act as a generator, the rotor must be driven above (but only slightly above) its synchronous speed, that is, the rotor must rotate at a frequency which slightly exceeds the frequency of rotation of the magnetic field produced by the stator windings when energised (a so-called "negative slip" condition).

Within the general category of induction generators, different specific constructions and methods of stator winding energisation are possible. One particular construction employs a so-called "squirrel cage" rotor comprising a plurality of (typically aluminium or copper) bars extending in parallel around a longitudinal axis, electrically connected by ringed caps, and defining a cylindrical rotor. The squirrel cage usually has an iron core and rotates within the stator.

The stator windings must be energized for the arrangement to produce electricity. This may be carried out either by excitation from an external source or by self excitation. In a wind turbine (intended for generation of electricity for the grid), the grid itself may supply power to the stator windings, either directly or indirectly. Direct excitation of the windings by the grid has the advantage that electricity is generated at the frequency and voltage imposed by the grid. However it requires also that the turbine rotation speed is tied to the grid frequency so that the generator is more or less inefficient at all but a very narrow range of wind speeds. Mechanical gearboxes have been proposed to alleviate this but these are noisy, complex, expensive and add to the overall mass. Moreover, once the prime mover drives the generator above its generating speed, it ceases generating and ceases resisting the movement of the prime mover; this in turn can result in over-speed and self-destruction. WO-A-94/03970 addresses this problem but requires an expensive, bespoke wound-rotor induction motor rather than the simpler, cheaper squirrel-cage induction motor described above.

Instead of a direct three phase connection from the grid, an electronic system may instead be provided to supply three phase power to the stator windings at a variable voltage and frequency so as to allow the turbine/generator combination to extract power at maximum efficiency over a range of wind speeds: see, for example, "Power electronics for modern wind turbines" by Blaabjerg, published by Morgan and Claypool.

Although such arrangements do provide much more flexibility than the directly grid connected arrangements outlined above, they are however very expensive, complex and difficult to fault find and repair when in situ. Thus the are prohibitive for smaller wind turbines intended for domestic use with an output of, say, 10 kW or so.

As an alternative to external excitation of the stator windings, self excitation by the provision of a local reactive current is also possible. The simplest way to provide such a reactive current is to operate the generator into a passive load having a suitable reactive component, such as a local capacitor bank. The self excitation condition is that the total series impedance of the generator plus its load is zero: that is, both the real and imaginary components of the total impedance are zero. Then, the conductive component of the generator impedance is cancelled by the capacitance of the load impedance and the apparent negative resistance of the generator equals the resistance of the load.

Although self excitation avoids the requirement for a grid connection, on the downside, a capacitatively loaded induction generator that is configured to output a given voltage is capable of generating over only a very narrow band of frequencies above the frequency for which the total impedance of the circuit is zero. Thus, to maintain generation, the frequency of the prime mover must be carefully regulated. One suitable arrangement to address that is shown in GB-A-405,234. Nevertheless, such arrangements suffer from the same disadvantages of the directly grid connected induction generators described above, in that the turbine must rotate at essentially a fixed speed so that either a mechanical gearbox or feathering of the turbine blades must be employed. A further disadvantage with such arrangement is that the output voltage of such a self excited induction generator varies with the torque provided by the prime mover (turbine blade) unless steps are taken to regulate it. US-A-2006/132, 103 and U.S. Pat. No. 4,417,194 propose techniques for regulating both voltage and frequency of such a self excited induction generator. However, such arrangements are unsuitable for use with a wind turbine because of the need to control the input torque. Other arrangements of stator windings are contemplated in, for example, U.S. Pat. No. 6,788,031 and US-A-2004/0263110 but again these suffer from cost and complexity of manufacturing.

In principle, the reactive current needed to excite a self excited induction generator can be varied by employing a variable capacitor as the reactive load upon the generator. However, the size of capacitance required for a workable generator is tens or hundreds of microfarads and variable capacitors of this magnitude are impractical. One solution that has been proposed to this practical problem is to use an electronic network that performs active power factor correction (APFC). This relies upon the observation that the reactive current supplied to the generator need not be a perfect sine wave in order for the generator to self excite. Triacs may be used to switch inductive and reactive components in and out of the generator circuit on a timescale comparable with or less than the period of an electrical power cycle. This has the effect of moderating the effective amplitude of the injected reactive current and is thus similar in effect to varying the value of a simple load capacitor. US-A-2006/132103 and U.S. Pat. No. 4,242,628 show examples of this approach. Cost and complexity are once more problems, however.

U.S. Pat. No. 2,758,272 shows a different and more primitive method of implementing power factor correction. Here, the induction generator is operated in parallel with the primary winding of a saturable transformer across the secondary winding of which is connected a fixed reactive load. By varying the DC current through the transformer windings, the saturation of the magnetic core may be controlled for which in turn controls modifies the mutual inductance, and hence in turn the value of the secondary reactance seen reflected at the primary terminals. Although this technique avoids the use of semiconductor power electronics, and thus side steps the choice between cheap but low reliability semiconductors and expensive but more reliable triacs), the expense and complexity of manufacture of a suitably bespoke saturable transformer also means that such an approach is not favoured.

Instead of trying to control multiple variables (torque, reactive current, voltage and/or frequency)—see for example the above referenced US-A-2006/132103—still further prior art arrangements seek to hold constant the ratio of the voltage to the frequency, as described in U.S. Pat. No. 2,922,895. Whilst this may be suitable for the supply of power to induction motors, it is wholly unsuitable for the case of providing electrical power output from a wind turbine.

SUMMARY OF THE INVENTION

Against this background, there is provided an electrical generator as defined in claim 1.

The bulk of the prior art discussed in the introduction suffers from limitations of one or more of cost, complexity, efficiency and reliability. In the main, these drawbacks are a consequence of the perceived need to control the generator output voltage and/or frequency, which requires accurate regulation of the reactive excitation current and/or prime mover torque. The generator of the present invention recognises that, although for power generation where the output is either to be supplied to the national grid or for general domestic consumption, the supply does indeed need to have a regulated voltage and frequency (50 Hz and 240V in the UK; 60 Hz and 120V in the United States), for other useful domestic applications, regulated voltage and frequency is not necessary. In particular, if the output of the generator is simply used to resistively heat a hot water supply, the frequency and voltage supplied to the resistive load is not, in absolute terms, of concern. Once it has been acknowledged that voltage and frequency control are not necessary for useful operation of the wind turbine, it is possible instead to focus upon harvesting the maximum available wind energy across a range of conditions for a given maximum allowable turbine diameter. The solution proposed by the present invention can thus employ economically produced equipment such as a cheap, reliable, robust, proven, "off the shelf" mass produced induction generator, such as a standard squirrel-cage induction generator.

In other words, in contrast to the arrangements of the prior art, embodiments of the present invention do not attempt to control generator output voltage, generator electrical output frequency or prime-mover torque, but instead accept what ever is the maximum torque/power that the prime mover will supply, and then allow the voltage and frequency to float at what ever values are consistent with operation of the turbine/generator combination at maximum (or at least optimum) energy extraction efficiency. This permits substantially all of the available power to be injected into the load.

In fact, the intermittent nature of wind power means that applications that require controlled voltage and frequency are inherently unsatisfactory anyway, in the sense that either expensive and inefficient electrical storage, or costly and inefficient electronics to inject the power into the national grid, is necessary.

From the point of view of domestic finances, it may be noted that approximately 40%—and up to 50%—of a typical domestic energy budget contributes to the heating of water for bathing etc., and for central heating. As a by-product of the approach set out in embodiments of the present invention, the energy which may well be only intermittently available (dependent upon the wind) can be stored in the form of hot water rather than having to store the electricity as such which is much more expensive. In this regard, the generator of embodiments of the present invention is more analogous to a solar hot water system (natural energy is used directly to heat water for domestic use), whilst the approach that tends to be taken by the prior art, involving control of the voltage and frequency produced, is more akin, at least at a conceptual level, to solar photovoltaic cells which produce electricity (though of course, as DC) from natural energy, which must then be stored and subsequently converted into heat if water is to be heated.

In a most general sense, embodiments of the present invention simply present a fixed reactance (capacitance) to the stator windings, along with a fixed load resistance, the value of each component being chosen so as to allow the generator to operate at or near its maximum power output across a range of wind speeds that are typically found in practice. Note, in this case, that the voltage and frequency of the generator output are deliberately allowed to find their own level with the optimal power output being the primary aim.

For example, the median wind speed for a particular region of a country could be monitored, and the value of the capacitance and load resistor could then be selected to provide optimal power output of the generator at that median wind speed. In this regard, the shape of the turbine power vs. speed curve is felicitous: it has a broad, relatively flat peak meaning that the generator continues to operate at or near maximum power output for a relatively wide range of wind speeds either side of the median.

Although, in a most general sense, aspects of the present invention provide for a fixed capacitance and resistance, in a preferred embodiment, at least the capacitance, and most preferably the resistance of the load as well, is variable. This allows the generator to provide maximum or near maximum power output across a wider range of wind speeds incident upon the turbine.

In particular, in order to optimise the power generated by the generator for various wind speeds, embodiments of the present invention optimally run at the designed tip speed ratio (TSR) under a range of wind conditions. This in turn implies that the turbine/generator rotational speed must vary substantially linearly with wind speed. Preferred embodiments of the present invention thus employ a variable transmission. Although a mechanical variable ratio gearbox could be employed, such devices are expensive, costly and difficult reliably to control. As a further consequence of the arrangements of preferred embodiments of the present invention, by contrast, where a transmission is employed, it may be implemented electrically and at minimal cost and in silence. Again, this is in part a consequence of the shift away from the control of voltage and frequency.

In a preferred embodiment of the present invention, this electrical transmission (gearbox) is provided with a coarse control element, by the provision of variable capacitance. Particularly preferably, fine control is also provided by the provision of a variable resistance load as well.

Coarse control of the reactance presented to the generator is most preferably by means of a plurality of capacitors, each of fixed capacitance, with different combinations of these capacitors being switchable in series or parallel with one another to provide a multiplicity of (discrete) capacitances. Each capacitance provides a reactance that is suitable for optimal generator power output across a relatively limited range of wind speeds; once the wind speed changes so that a given capacitance is no longer optimal, the controller switches in a different set of the capacitors.

Fine control across the determined range of wind speeds appropriate for each discrete capacitance is provided by utilising the magnetic non-linearity inherent in the self exciting induction generator itself. Again this contrasts with the approach of the prior art, where, typically, expensive and complicated schemes are employed to suppress the generator non-linearity. By providing a variable resistance load, such as a plurality of resistors of different values, and then by choosing as appropriate load resistance, any increase in mechanical frequency (as a consequence of small variations in wind speed) can be arranged to correspond to what is needed to maintain the turbine at its correct TSR.

In other words, the transmission (gearbox) included in preferred embodiments of the present invention can be considered as comprising two separate components: a switchable fixed ratio gearbox provided by an array of discrete capacitors, in the preferred embodiment, which may be, for example, switched by relays, in tandem with a continuously variable electrical gearbox provided, for example, by an array of separate resistors which may again be switched using relays and may, in preference, be provided in a hot water tank directly to heat water. Note that, by allowing the voltage output of the generator to "float", the voltage drop in the induction generator output upon switching in loads is no longer a serious issue, as it is in any prior art arrangement which requires the voltage and frequency of the output of the generator to be controlled.

The switchable fixed ratio gearbox provides course control whilst the continuously variable electrical gearbox provides fine control and can be considered analogous, electrically, to an automotive epicyclic multi speed gearbox in tandem with a fluid torque-converter.

As an alternative to a multiplicity of discrete capacitors with switches, and a multiplicity of resistors forming a switchable load, the generator may instead include a fixed capacitance together with a triac arrangement providing active power factor correction. A generator controller then controls the triac arrangement rather than the switching of the discrete capacitors. The effect of this is to provide an effectively continuously variable capacitance, allowing the peak in the turbine power/speed curve to be tracked more accurately. This in turn may negate the need for a variable resistance load, although for the very highest accuracy such a load could be provided, either by a switched array of fixed resistors or even by provision of a second triac arrangement with a fixed resistance. Of course the penalty for the ability to track the peak in the power/speed curve with greater accuracy (as provided by a triac) is the cost and the control complexity.

In another aspect, the invention provides for An electrical generator comprising a turbine, a rotor, driveable by the turbine, a stator having stator windings; and an electrical circuit, connected to the stator windings and presenting a load thereto; the electrical circuit comprising a first part presenting a substantially reactive load to the stator windings, and a second part presenting a substantially resistive load to the stator windings, and wherein the values of the reactance and resistance are selected so that the generator produces a generator output whose voltage and frequency varies with wind speed across a predetermined range of wind speeds, whilst the power output remains at or adjacent a peak power output of the generator across that predetermined wind speed range.

Other features of the present invention will become apparent from a review of the detailed description that follows, and the claims.

BRIEF DESCRIPTION OF THE DRAWINGS

The invention may be put into practice in a number of ways and some preferred embodiments will now be described by way of example only and with reference to the following figures in which:

FIG. 13 shows a data sheet of a typical induction generator;

FIG. 14 shows a first list of parameters relating to the typical induction generator whose data sheet is shown in FIG. 13, when loaded with a first impedance;

FIG. 15 shows a second list of parameters relating to the typical inductance generator whose data sheet is shown in FIG. 13, when loaded with a second, different impedance;

FIG. 17 shows a third list of parameters relating to the typical inductance generator whose data sheet is shown in FIG. 13, when loaded with a third, different impedance;

FIG. 18 shows a fourth list of parameters relating to the typical inductance generator whose data sheet is shown in FIG. 13, when loaded with a fourth, different impedance;

DETAILED DESCRIPTION OF A PREFERRED EMBODIMENT

Before describing a preferred implementation of the present invention, a brief review of the theoretical principles of induction generators (and in particular, self excited induction generators) is appropriate, since this will assist in an understanding of the particular approach taken—specifically, the reasons why it is beneficial, in the present application, to set aside the requirement to control voltage, frequency and/or prime mover torque.

Ideal Induction Generator

Figure 1:
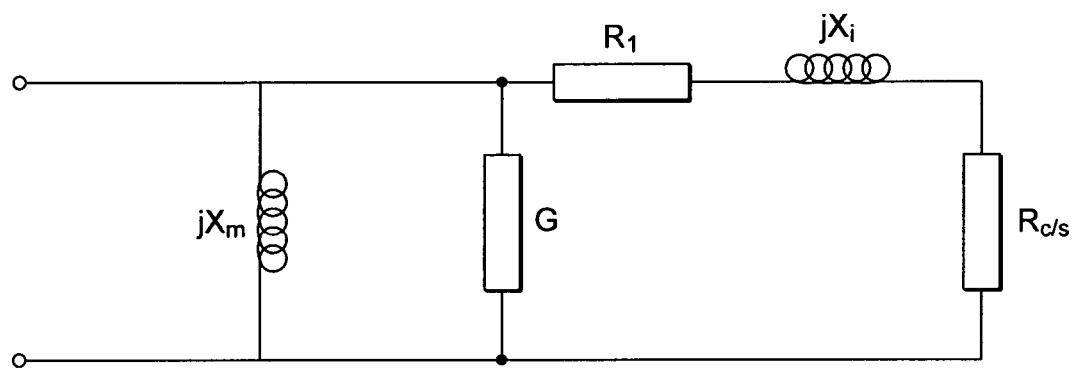
FIG. 1 shows an equivalent circuit for one of the phases of a self-excited induction generator.

FIG. 1 shows an equivalent circuit for one of the phases of an induction generator. $jX^m$ is the impedance of the stator winding, G represents the iron losses, Rl represents the stator copper losses, $jX^l$ represents the imperfect coupling between the stator and rotor and $R_c/s$ represents the squirrel-cage impedance where the value of the slip, s, is negative for generation and hence so is the value of the cage impedance. The values of $X_l$ and $X_m$ are, of course, frequency dependent.

Figure 2:
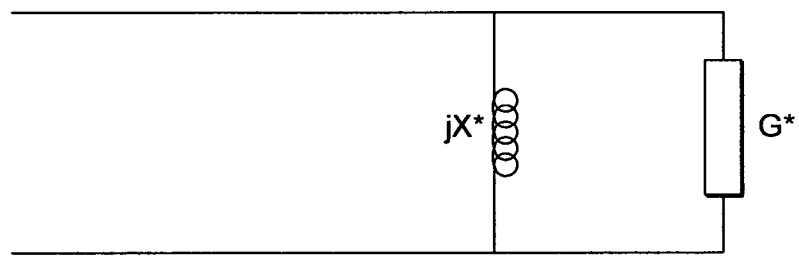
FIG. 2 shows a reduced version of the equivalent circuit of FIG. 1, in a particular case.

At particular values of frequency and slip, the equivalent circuit may be reduced to the scheme of FIG. 2, where the conductance G* is negative, provided that the slip is sufficiently large and negative.

Figure 3:
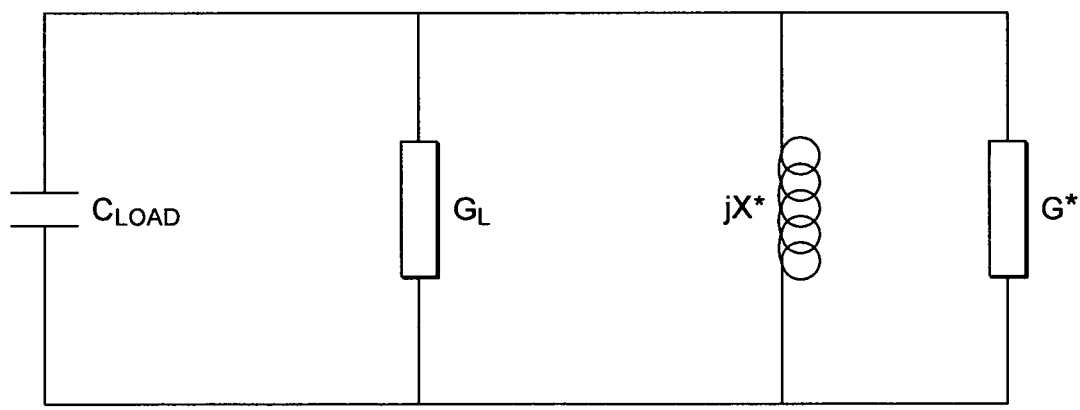
FIG. 3 shows an equivalent circuit of the generator of FIG. 1, connected to a load.

FIG. 3 shows the generator operating into a reactive load $C_{LOAD}$. The condition for self-excitation is that G*=−G, and X*=1/($\omega_e$C).

Figure 4:
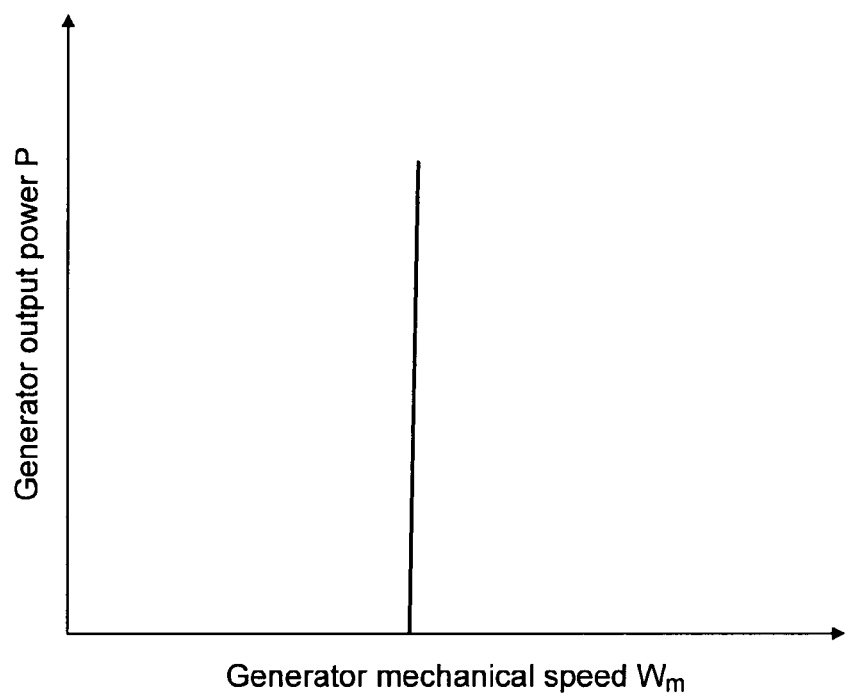
FIG. 4 shows a graph of generator power output as a function of generator (rotor) speed, for an ideal generator.

According to the simple theory of induction machines, none of the component values in FIG. 1 is dependent upon the power generated. This implies that the self excitation condition set out above is also power-independent, and hence that the generator's speed/power characteristic is a vertical line which is illustrated in FIG. 4. Thus, no matter how hard the ideal generator is driven, both the mechanical and electrical frequencies $\omega_m$ and $\omega_e$ of the generator remain fixed.

If $G_L$ changes, G* must change to track it if self-excitation is to be maintained. This in turn means a different value of $R_c/s$ and hence of the slip, s. Changing the slip also alters the value X*, but this (and the resulting change in electrical generation frequency) is a second order effect which can be ignored for most purposes.

Real Induction Generators

Figure 5:
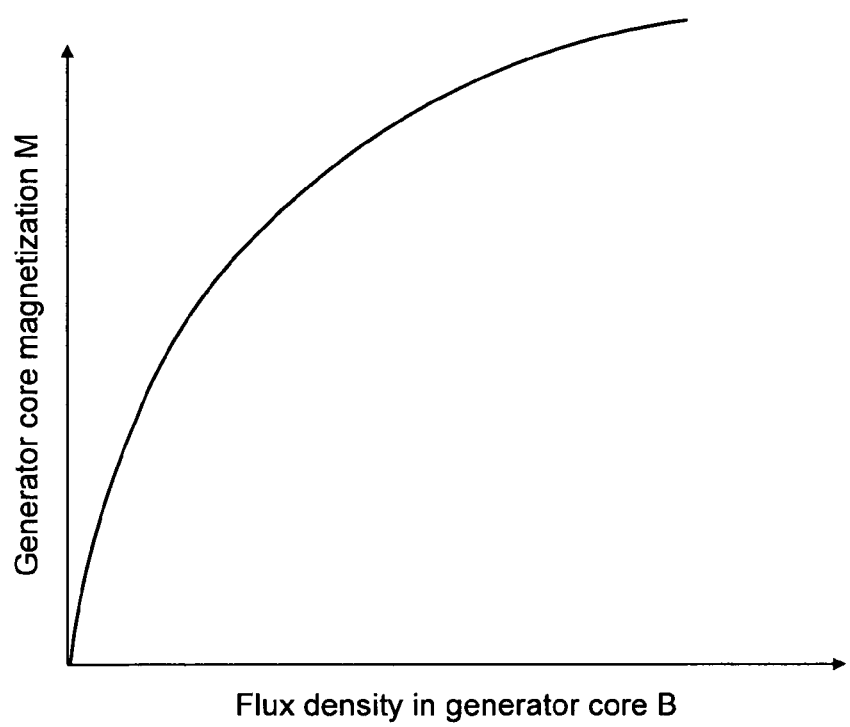
FIG. 5 shows a graph of M vs H for the generator core.
Figure 6:
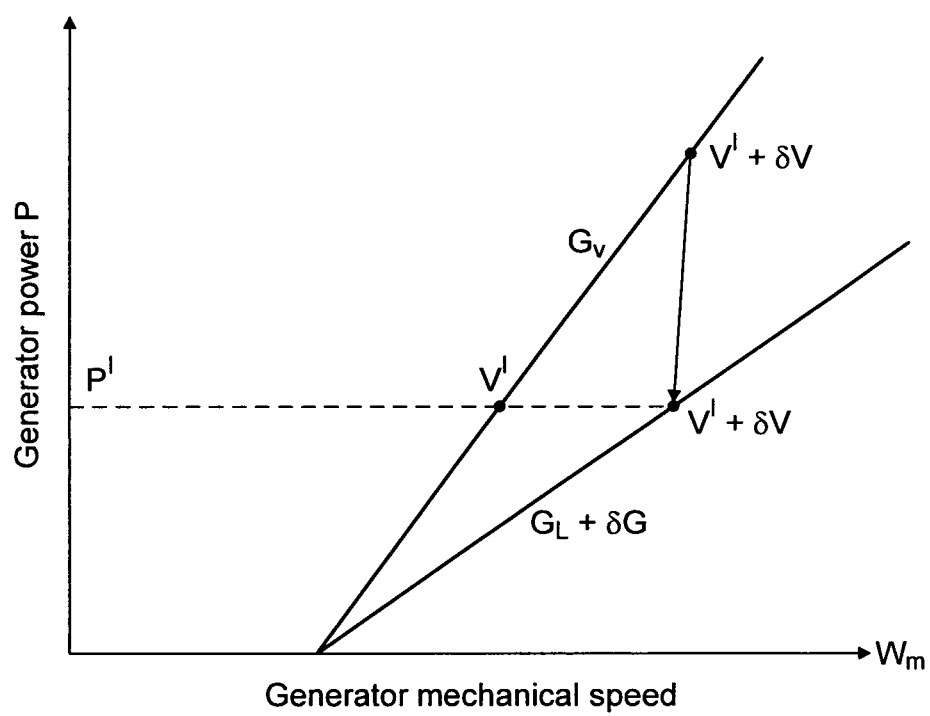
FIG. 6 shows a graph of generator power output as a function of generator rotor speed, for a real generator.

In a real induction generator, the equivalent circuit component values are not, in fact, power-independent. In particular, in a real induction generator, the machine's soft iron magnetic circuit saturates progressively as the power rises. This is illustrated in FIG. 5. This in turn means that, as the power rises, the soft iron magnetic circuit has a lower permeability, which in turn reduces the values of $X_m$ and $X_l$. In consequence, X* reduces and the electrical generation frequency $\omega_e$ increases. The consequence of this is that, in a real induction generator, the speed/power characteristic of the generator is not vertical (as illustrated in the ideal case of FIG. 4) but is instead slightly inclined to the vertical, as shown in FIG. 6.

The parameter that determines the degree of saturation of the iron core is the magnetic flux density B in the core. From the Maxwell equation curl E=−dB/dT, the flux density B is proportional to $V_p/\omega_e$, where $V_p$ is the generator's phase voltage.

The effect of changing $G_L$ may then be considered for a real induction generator instead of an ideal generator. The frequency shift is still negligible, as discussed above in connection with the ideal generator. However, if the load conductance $G_L$ is decreased to $G_L$−δG, the phase voltage needed to deliver a particular power P' to the load must increase from V' to V'+δV. Accordingly, the generator power/speed curve drops to make an even larger angle to the vertical, again as shown in FIG. 6.

The consequence of this is that, if $V_p/\omega_e$ can be made an independent variable and hence used as an control parameter for the magnetic non-linearity, the behaviour described above can be exploited to tailor the power/speed characteristic of a self-excited induction generator to suit a particular purpose such as optimally matching to the characteristics of the prime mover turbine that drives it.

To illustrate some of these features of induction generator operation, some measurements made on a typical induction generator are illustrated in the appendices. The data sheet of the induction machine upon which the measurements were performed is shown in FIG. 13 and has the following approximate equivalent circuit parameters:

$X_m/\omega_e$=0.37 Henry
$X_m/\omega_e$=29 milliHenry
$R_l$=3.48 Ohm
$R_c$-1.76 Ohm
1/G=1300 Ohm FIG. 14 shows the results for a generator loaded with a capacitance of 80 microfarads in parallel with a 100 Ohm resistor. FIG. 15 shows the results for the same generator loaded again with an 80 microfarad capacitor in parallel with a 130 Ohm resistor. The following are of note. Firstly, the value of slip where the load is 100 Ohms (FIG. 14) is −0.0183 and, to all intents and purposes, this value stays constant over the entire frequency operating range (49 to 29 Hz). Thus, although in principle the slip is a function of frequency for a fixed resistive load, this effect may be ignored. Secondly, where the resistive load is instead changed to 150 Ohm as in FIG. 15, the slip changes to −0.018; note that this new value however stays constant over the entire frequency range (50 to 31 Hz). Finally, note from Appendices B1 and B2 that the voltage values in each case for the electrical frequency of, for example, 42 Hz are almost identical and 423V for the 100 Ohm case of FIG. 14 and 428V for the 150 Ohm case of FIG. 15. This is despite the power output in each case being widely different (5359 Watts in the case of FIG. 14, as opposed to 3656 Watts in the case of FIG. 15). This reinforces the point made above, that for fixed capacitative loads, the electrical frequency depends only on the value of $V_p/\omega_e$ and that this is therefore the controlling parameter for the magnetic non-linearity.

Figure 16:
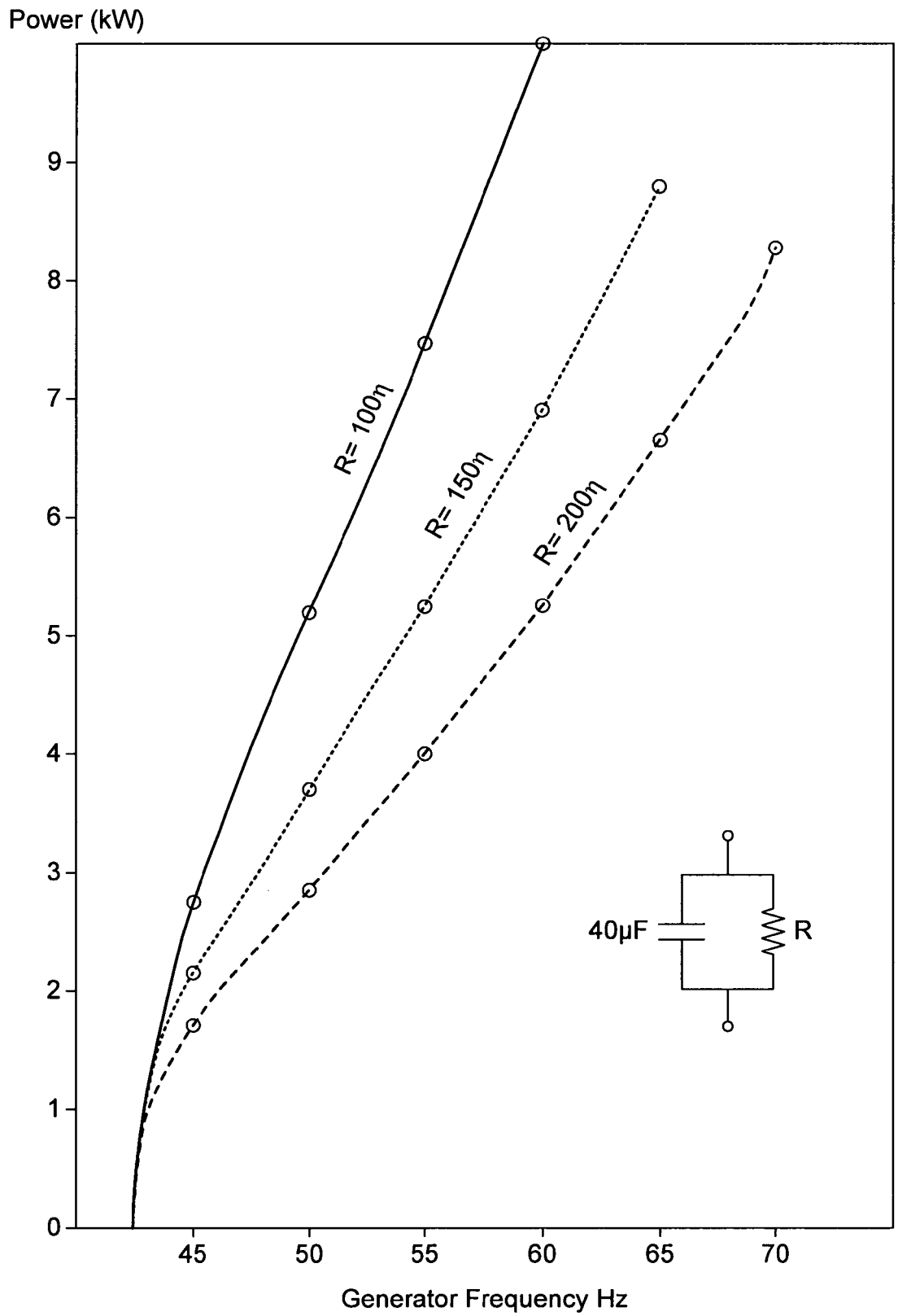
FIG. 16 shows a plot of generator frequency versus output power for the typical inductance generator whose data sheet is shown in FIG. 13, when loaded with a number of different impedances.

FIG. 16 shows a graph of generator power (kW) versus electrical frequency for a 40 microfarad capacitor in parallel with, respectively, 100, 150 and 200 Ohms. Note that the effect of increasing the load resistance from 100 Ohms to 200 Ohms is to increase the angle of tip of the curve. This therefore illustrates how the effect of the magnetic non-linearity may be modulated to manipulate the generator characteristics.

Figure 19:
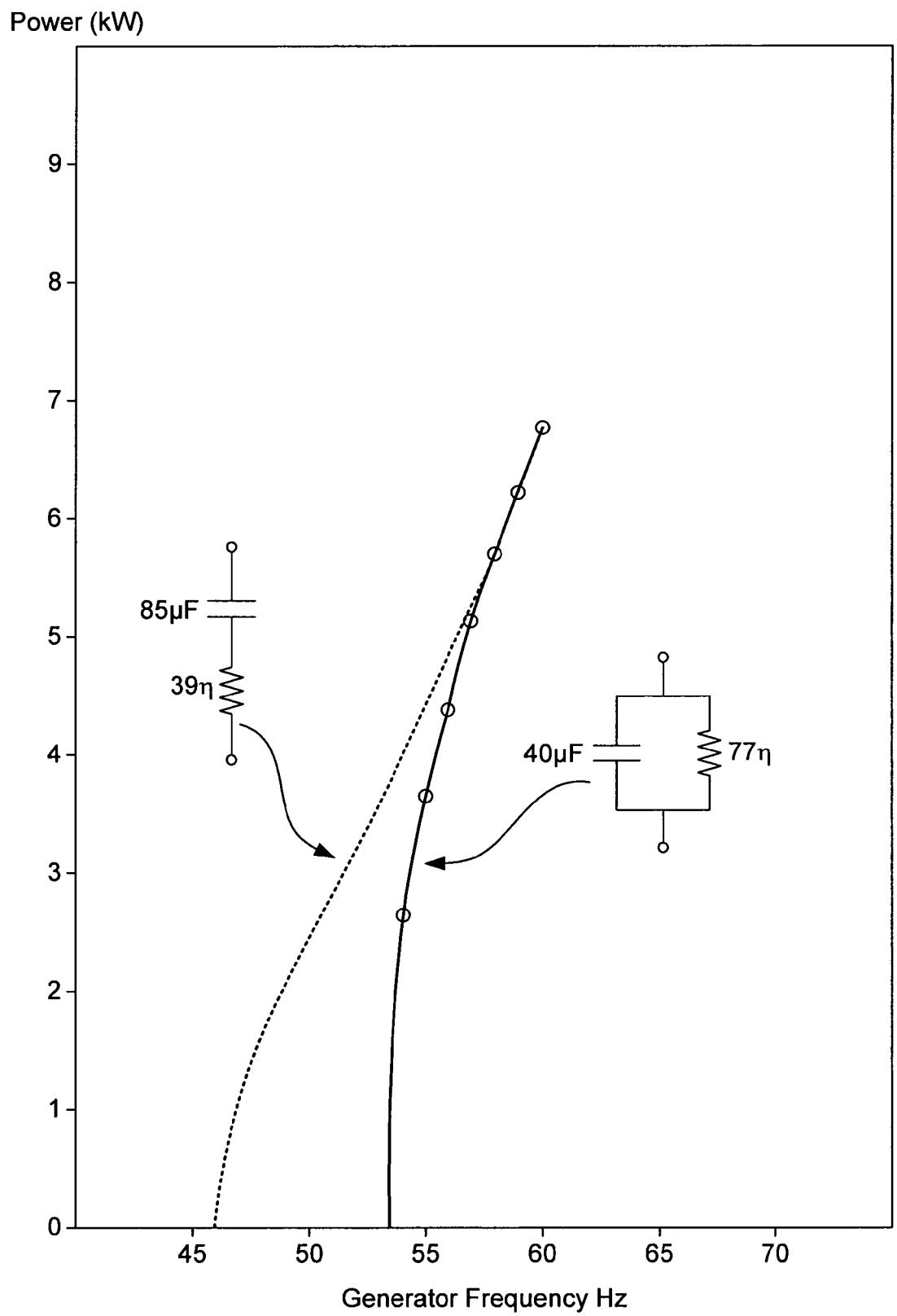
FIG. 19 shows a plot of generator frequency versus output power for the typical inductance generator whose data sheet is shown in FIG. 13, when loaded with the impedances of FIGS. 17 and 18 respectively.

FIGS. 17 and 18 show values for various parameters of the inductive generator with, respectively, a 39 Ohm resistor in series with an 85 microfarad capacitor and a 77 Ohm resistor in parallel with a 42.5 microfarad capacitor. The range of frequencies in FIG. 17 is between 50 and 37 Hz and the range of frequencies for the values in FIG. 18 is between 50 and 44 Hz. Note that these loads appear identical to the generator at an electrical frequency of 49 Hz (which equates to a turbine frequency of 2.9 Hz). FIG. 19 plots the power (kW) against generator frequency for the two load impedances of FIG. 17 and FIG. 18 respectively. Although it is clear from FIG. 19 that the loads are identical at the 49 Hz electrical frequency, it is equally apparent that, as the frequency drops, the curves diverge. The curve for the series connected capacitor and resistor of FIG. 17 reaches to a lower frequency before de-excitation. This characteristic of series loads may be useful in some situations.

The foregoing theory of an ideal and then a real self-exciting induction generator sets out the various physical parameters that may be controlled. As explained in the introduction, in general the approach of existing induction generators for wind turbines seek to control the generator output voltage and frequency, usually along with the rotor torque (by providing—usually mechanical—control of the rotor torque at various wind speeds). This inevitably results in a loss of efficiency in the sense that, over a large range of wind speeds, the turbine/generator combination is operating well below its maximum energy-extraction efficiency—that is, less or significantly less than the available power is injected into the load.

Embodiments of the present invention, by contrast, set aside the perceived need to maintain the voltage and frequency output of the generator within strictly defined limits and instead allows them to "float". The focus here is instead upon maximising the energy extraction efficiency across a range of wind speeds, regardless of what voltage and frequency that produces in the generator output. This in turn permits most or substantially all of the available power to be injected into the load. Where that load directly heats hot water, the total inefficiency in the system between the source of energy (wind) and the resulting product (hot water) is limited.

Figure 7:
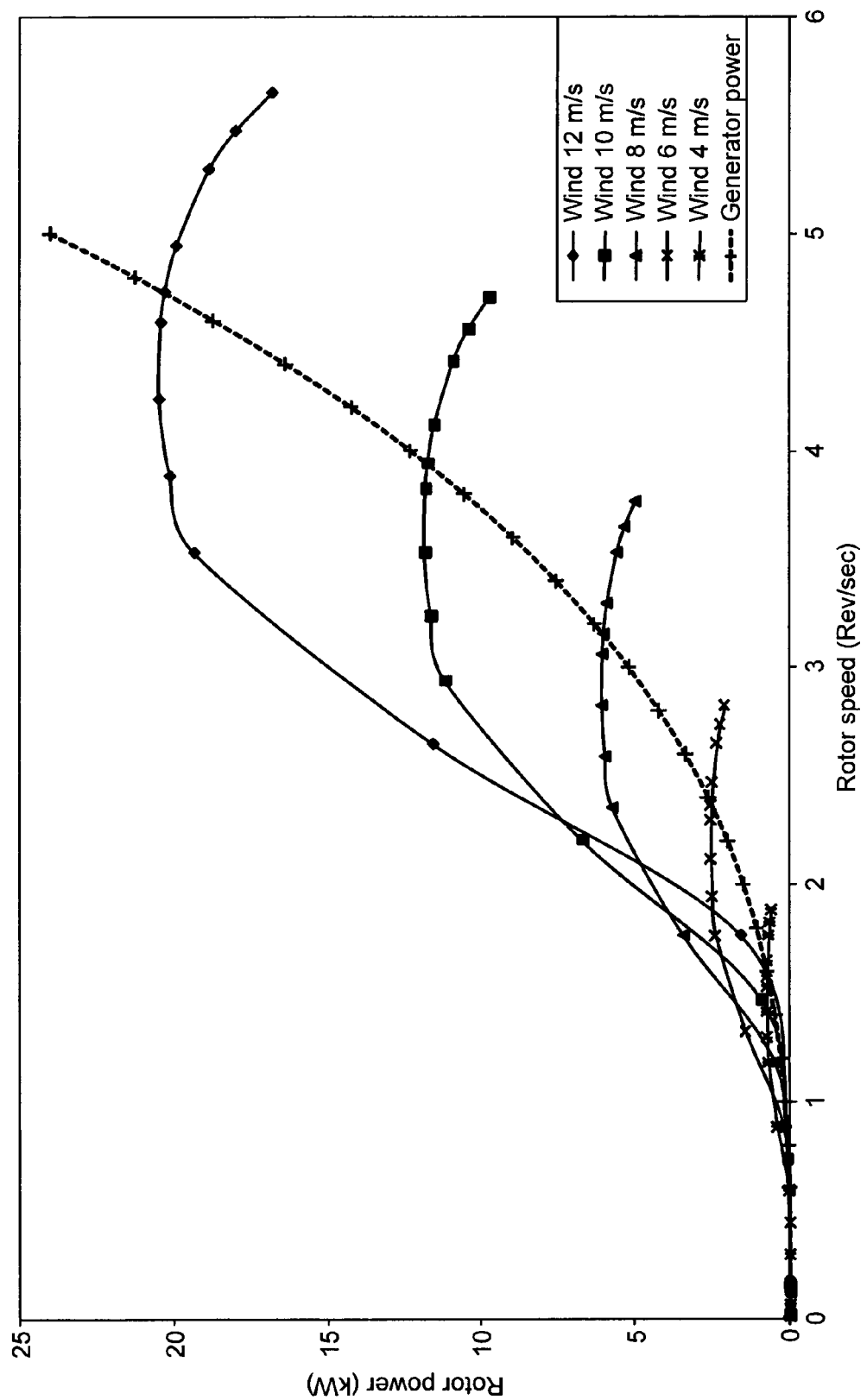
FIG. 7 shows a graph of generator power output as a function of generator (rotor) speed, for a plurality of different wind speeds.

To harvest the maximum possible wind energy at all wind speeds requires the use of a turbine whose aerofoils are optimised such that all segments of the aerofoil, irrespective of radius, provide maximum lift under the same conditions. Such a turbine has a family of power/speed curves—one for each wind speed—that rise to a maximum at a certain rotor frequency and then fall away again. One such power/speed curve (that is, the power/speed curve for a particular wind speed and wind generator) is shown in FIG. 7. The rotor frequencies at which the maxima of these curves occur scale linearly with the wind speeds to which the curves correspond. Another way to express this is to consider that the blade was designed to run at a certain tip speed ratio (TSR), this being a ratio of the speed of the blade tip to the speed of the wind. Working at the maximum of the power/speed curve for any particular wind speed is equivalent to running the turbine at the design TSR.

Moreover, it may be seen from FIG. 7 that the peak of the curve is relatively broad and flat. The consequence of this is that a turbine/generator arrangement may be configured that sets aside any output voltage or frequency control and instead optimizes the power output across a range of wind speeds, by providing judiciously chosen capacitance and resistance values for the generator (that is, by choosing fixed values of C and R that together locate the generator power/speed line or curve at or near the peak in the turbine power/speed curve at a predetermined median or typical wind speed. Then, because of the relatively slow dropoff from that peak (FIG. 7), approximately optimal power output continues to be achieved for wind speeds some way either side of that median or typical wind speed.

However, to achieve the aim of harvesting the maximum available wind energy at every value of wind speed, it is necessary to contrive the maximum possible power-transfer from the wind stream via the turbine and generator, to the resistive load that heats the hot water. This means that the generator/turbine system needs to run at or near the design TSR under a wide variety of wind speed conditions. This in turn implies that the turbine/generator rotational speed must vary substantially linearly with wind speed. To do this, the generator performance needs to be matched to the turbine and this is why a "gearbox" is desirable.

FIGS. 8, 10, 11 and 12 show, in each case schematically, some arrangements of a self-excited induction generator embodying the present invention. What links each of these different embodiments is the use of an electrical rather than mechanical gearbox which has several advantages (to different degrees: simplicity, cost, robustness and silence). In each case, a single phase is shown (and indeed single phase operation of the turbine/generator arrangement is contemplated), though it will of course be understood that 3 phase operation is likewise straightforwardly implementable using separate sets of stator windings radially spaced around the rotor.

Figure 8:
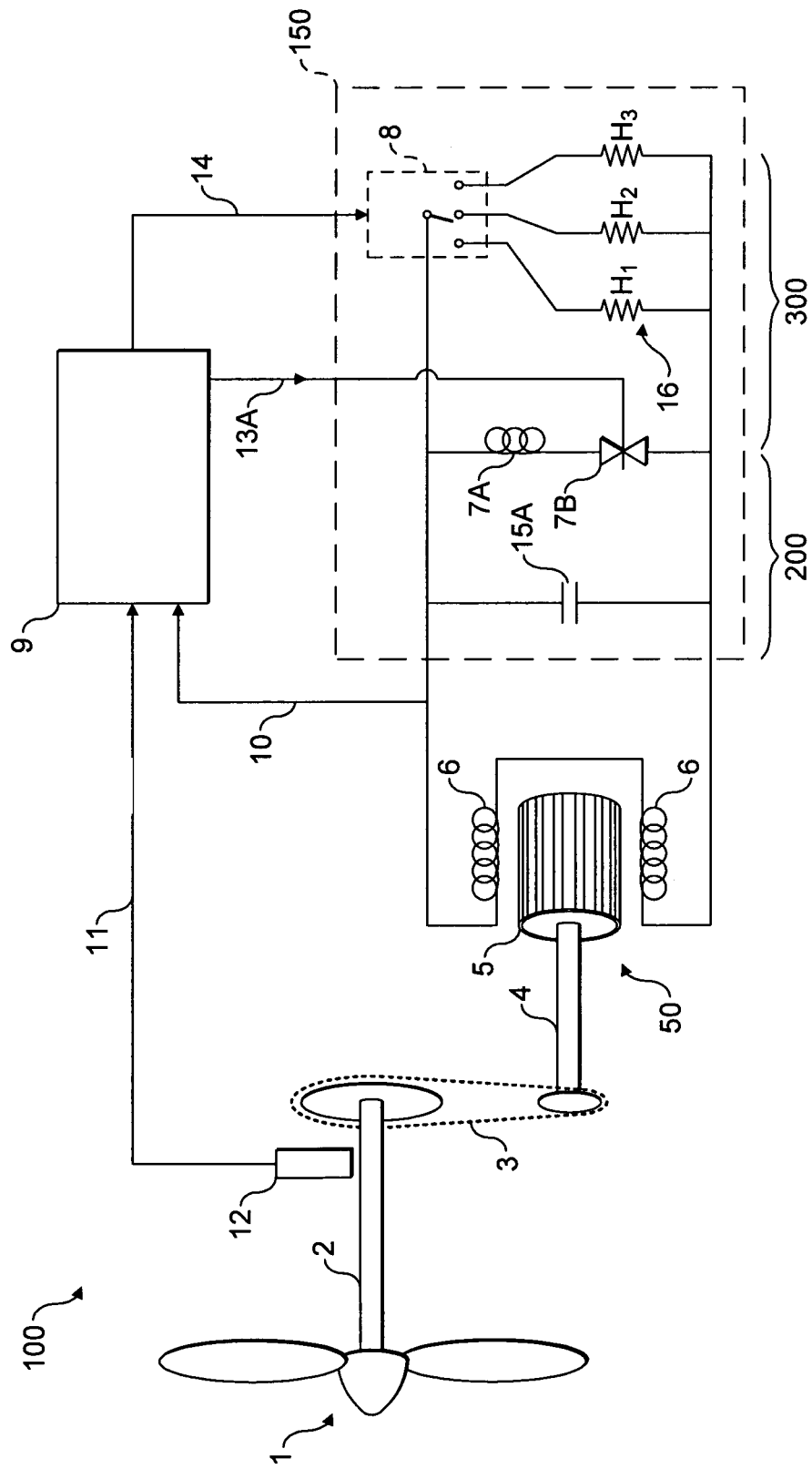
FIG. 8 shows in schematic form a first embodiment of a turbine/generator arrangement embodying the present invention.

Referring first to FIG. 8, a first embodiment of a self-excited induction turbine/generator arrangement 100 in accordance with the present invention is shown. The turbine/generator arrangement 100 comprises a turbine 1 mounted upon a shaft 2. The shaft 2 indirectly drives a generator shaft 4 via a fixed speed chain-driven gearbox 3. The generator shaft 4 is mounted upon a rotor 5 of a generator 50 forming part of the turbine/generator arrangement 100. In the preferred embodiment of FIG. 8 the rotor is of the "squirrel-cage" variety comprising a plurality of cylindrical rods each of whose elongate axis is arranged around the circumference of the rotor 5. The details of the squirrel-cage rotor itself will be familiar to those skilled in the art (a desirable feature of aspects of the present invention is that "off the shelf" components may be employed) and so will not be described further.

Mounted upon the shaft 4 is one or more magnetic "ticklers". These assist in reliable excitation of the generator: in the presence of the magnetic ticklers, the generator shaft conducts the magnetic flux into the generator and sprays fluxlines into the stator at the rotor frequency (and harmonics thereof) which is sufficiently close to the electrical frequency to cause excitation.

The rotor 5 rotates adjacent to a stator having windings 6. The stator windings 6 are connected to an electrical circuit which provides a load impedance to those stator windings 6 and thus the generator 50 is formed as a self-exciting induction generator.

The electrical components together form an electrical gearbox whose purpose will be further explained below. The components forming the electrical gearbox are shown within the dotted box 150 of FIG. 8. Within the electrical gearbox 150, a first gearbox part 200 provides active power factor correction (in the specific embodiment of FIG. 8), to control the reactive excitation current of the generator, again in a manner to be described further below. The first part 200 of the gearbox comprises a fixed value capacitor 15A in parallel with an inductance 7A and triac switching component 7B. The second part 300 of the electrical gearbox 150 is formed of a plurality of resistors 16 which act as heating elements for a hot water tank, for example. The resistors $H_1$, $H_2$, $H_3$ etc are arranged in parallel and are switchable by a relay 8, for example.

Control of the electrical gearbox 150 is achieved by means of a switching control logic unit 9. This receives, as a first input, a signal (preferably voltage for reasons to be explained) from the stator windings 6 of the generator, on line 10. Alternatively a measurement of the current in the stator windings 6 could be measured instead, and voltage inferred from that. The second input to the control logic unit 9 is provided on line 11 from a turbine rotor speed sensor 12 which is mounted adjacent to the turbine shaft 2. Any suitable speed sensor may be used, such as (but not limited to) an optical sensor, RF sensor or the output of a DC generator and so forth. Based upon those inputs, and using information previously obtained upon the specific characteristics of the magnetisation M of the generator core as a function of the flux density in the generator core B (which may, for example, be preloaded into a memory of the control logic unit 9 as a lookup table) the control logic unit 9 provides a first output on line 13A to control the triac switching component 7B and on a second line 14 to control the relay 8.

Obtaining the M-H curve is necessary if the load resistance is to be controllably varied. Fortunately, generators of a given type will each have a similar M-H curve so that it is only necessary to measure M as a function of H for a single given generator of that type and the results can then be used to populate the look up table for all subsequent generators of that type without having to measure that characteristic separately for each. One technique for measuring M-H is as follows. A parallel capacitance C is placed across the generator but without any resistance R. The generator is then placed on a lathe-bed (continuously variable speed lathe) and that lathe drives the generator. Because there is no R in the load, it does no work so the slip s=0. Rc/s is thus infinite. Hence, the right hand part of the circuit of FIG. 1 becomes open and Rc, Rl and jXl vanish. So the frequency of generation is now set by the value of C that is connected to the stator windings of the generator, and so is the value of jXm (which of course is the parameter to be determined). Measuring the electrical frequency (which is the same as the lathe frequency in this instance) versus the generator output voltage yields a lookup table that provides the value of jXm at any later point. Then, by measuring the voltage in the stator windings (which is output to the controller 9 on line 10) and consulting the look up table stored in the controller, the value of jXm can be determined. In a simplest scheme (particularly where the load resistance is a plurality of relay switched resistors, as described in FIG. 10 below), the look up table may be relatively sparsely populated: the relay may be forced by the controller to switch at a relatively small number of different rotor speeds. For the more sophisticated triac controller of FIG. 8, however, a fuller voltage/frequency dataset may be stored in the controller look up table for real-time processing.

Note that the voltage is single valued in Xm. From Faraday's law, V=NABω (B is magnetic flux in the generator iron core, A is the core cross section, N is the number of turns of the stator winding, and ω is electrical frequency). So V is single valued in B which is single valued in M which is single valued in Xm.

Having explained the physical and logical layout of the turbine/generator arrangement 100 of FIG. 8, its method of operation will now be described, with reference also to the theory of real inductive generators outlined above.

Figure 9:
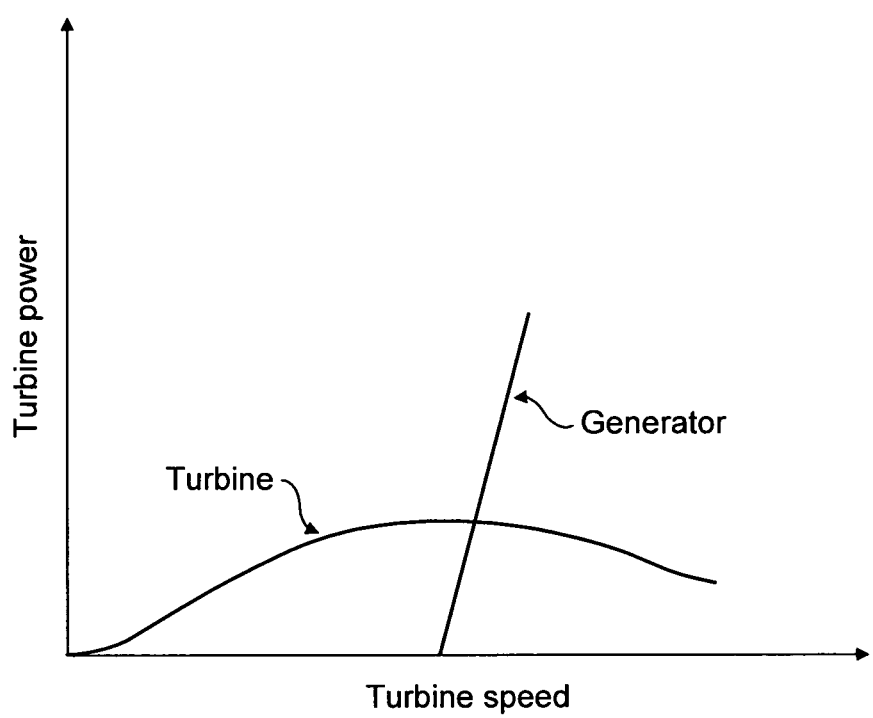
FIG. 9 shows the generator power output as a function of generator rotor speed, and also separately the turbine power output as a function of turbine rotational speed, to illustrate the intersection of the two.

The operating point of the turbine/generator arrangement 100 is determined by the intersection point of the respective power/speed curves of the turbine 1 and the generator 50. To obtain maximum efficiency at all times, it is necessary that, across the range of wind speeds for which the turbine/generator arrangement 100 is expected to operate, this intersection of power/speed curves occurs close to the maximum of the turbine curve for the relevant wind speeds. The turbine power/speed curve is shown schematically in FIG. 9, together with the generator speed/power "curve" which is, as was seen in FIG. 6, in fact a line of variable slope. The ability to vary the slope of the generator power/speed line helps to align it with a maximum of the turbine power/speed curve, which can itself be shifted by altering the reactance presented to the stator windings 6. Note, in FIG. 9, that the turbine speed/power curve has a broad, generally flat peak rather than a sharp peak. This felicitous property of the turbine power/speed curve helps to maintain maximum power output across a wide range of wind speeds. Because the principle of embodiments of the present invention is to ignore the requirement to regulate voltage and frequency, it is possible instead to have the flexibility to set the position of the intersection of the two power/speed curves. The reactive excitation current (in the stator windings 6) does not need to be controlled, so it can be arranged to be supplied at an appropriate level by suitable control of the active power factor correction unit constituted by the triac switching component 7B, the inductance 7A and the fixed capacitance 15A in parallel with them. The control logic unit 9 adjusts the value of the reactive excitation current in the stator windings 6 so as to position the steeply sloping line defining the power/rotor speed relationship (FIG. 6 again) at or close to the peak in the turbine power/speed curve, again as is shown in FIG. 9.

By controlling the active power factor correction unit (the first part 200 of the electrical gearbox 150) so as to ensure that the generator power/speed line passes through or near the peak in the turbine power/speed curve, the turbine may operate at the design TSR and hence at maximum energy extraction efficiency as previously mentioned. It further allows the turbine/generator arrangement 100 to operate as a constant power source; that is to say, for given wind conditions, substantially all of the power delivered to the turbine is injected into the load 16 irrespective of the size of that load and hence irrespective of the voltage across the load. This is because the maximum of the turbine's power/speed curve is broad and flat (FIG. 9 again) whereas the generator's power/speed line is almost vertical, and so the generator curve line tips only very slightly relative to the vertical as the resistive mode is varied so that the intersection point remains around the peak of the turbine power/speed curve, at constant power. Constant power operation also has the desirable consequence that the resistance value of the load 16 may be treated as an independent variable which can be employed to rescale the magnetic non-linearity, so as to tip the generator line (as shown in FIG. 6) and so fine tune the way that the power matching tracks the wind speed without sacrificing power transfer to the generator to the load.

It is for this reason that the electrical gearbox 150 may be considered, logically, to comprise of the two parts 200, 300. The active power factor correction unit that comprises the first part of the electrical gearbox positions the generator power/speed line relative to the turbine power/speed curve so that it is at or near the maximum of the latter; the second part 300 of the electrical gearbox 150 is formed in the embodiment of FIG. 8 of the array of switchable resistors 16 with switching between those resistors altering the slope of the generator power/speed line which in turn permits fine tuning of the location of the intersection between the generator and turbine power/speed curves.

The description above of the reason for the different slopes in FIG. 6 informs the reason why a plurality of (preferably switchable) resistive modes helps in tracking the maximum in the turbine power/speed curve. As the wind speed increases, so the turbine delivers more power and the turbine speed needs to increase to maintain its efficiency. The additional power delivered to the load means that there is a larger output voltage which in turn increases the magnetic core flux density and hence the magnetic saturation. The size of the voltage for a given power is determined by the load resistance which, as explained previously, is an independent variable and hence allows a degree of magnetic saturation to be controlled. The saturation lowers the core permeability and hence the generator inductances. So the electrical frequency increases, and, with it, the mechanical frequency of the generator rotor 5 and turbine 1. By choosing the appropriate load resistance 16, this increase in mechanical frequency can be arranged to correspond to exactly what is needed to maintain the turbine at its correct TSR. Although as a general principle the value of the generator output voltage is not controlled, that is, it is allowed to "float" to whatever happens to be appropriate to maximise the efficiency of the turbine/generator arrangement 100, it is nevertheless preferable that there is an over-voltage safety cut-out provided so as to avoid damage to or destruction of the arrangement 100. The over-voltage protection prevents the generator output voltage from exceeding the rated voltage of the generator windings or of the resistors 16 to which power is supplied. Because (as explained above) the generator is operated as a constant power device and because the power P equals $GV^2$, where V is the generator output voltage and G is the load conductance, for any input value of P from the prime mover, the controller logic in the switching control logic unit 9 is set to make sure that the voltage is pulled down to within the safe operating range by switching in more heater elements to increase G to an appropriate value. This feature is, however, an additional, desirable but inessential function of the logic/switch bank/resistor array.

Figure 10:
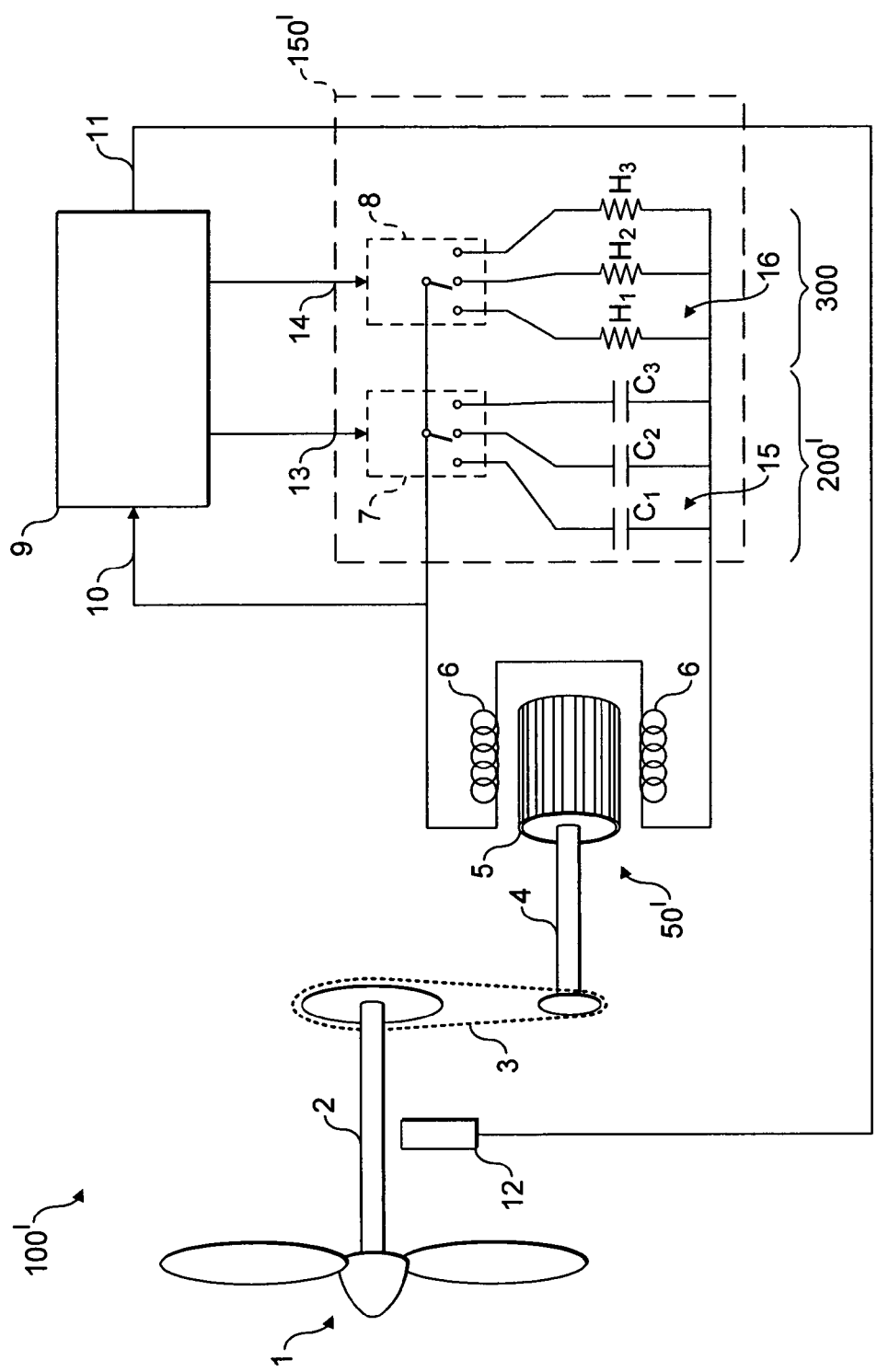
FIG. 10 shows in schematic form a second embodiment of a turbine/generator arrangement embodying the present invention.
Figure 11:
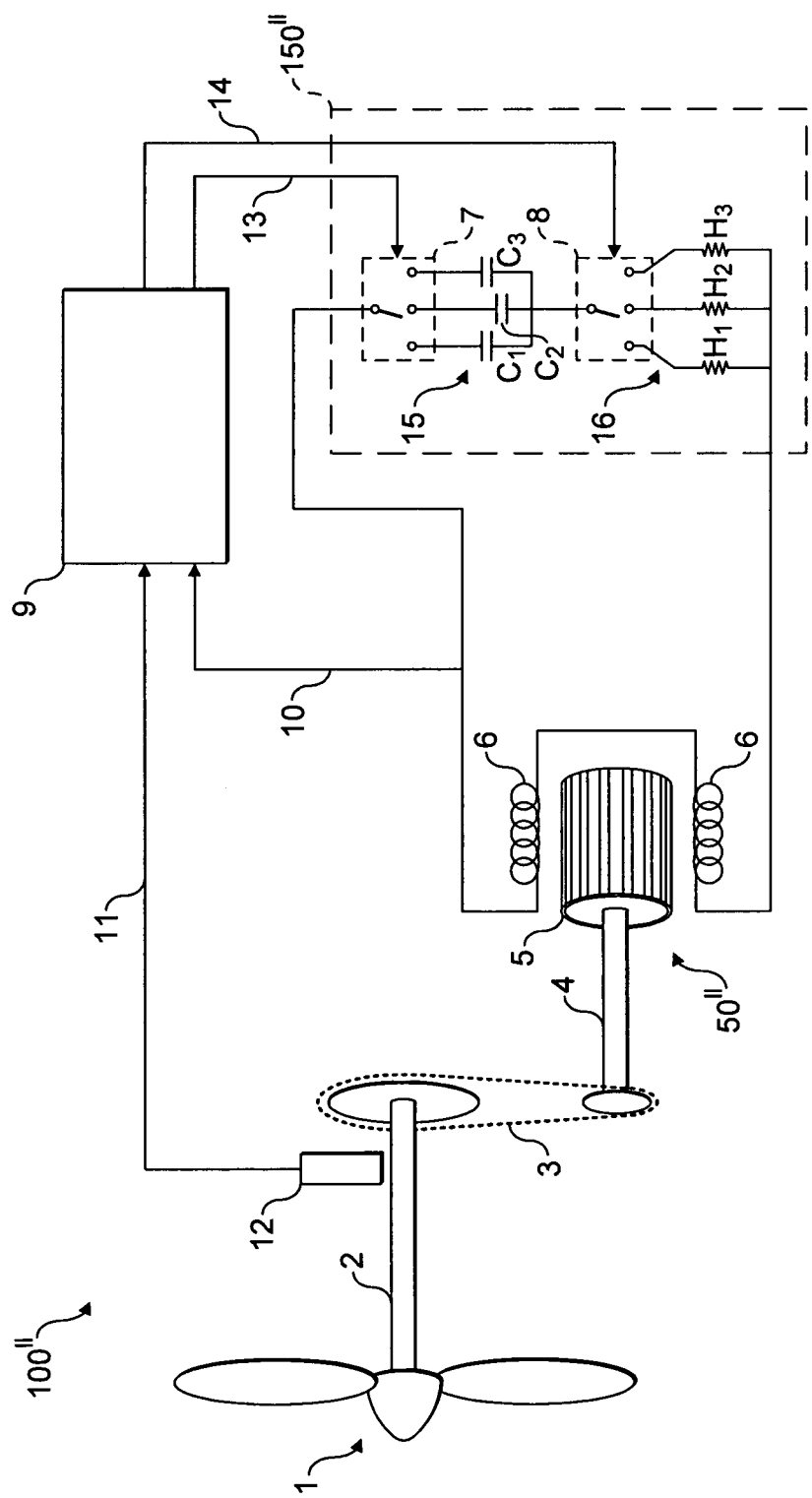
FIG. 11 shows in schematic form a third embodiment of a turbine/generator arrangement embodying the present invention.

FIG. 10 shows an alternative arrangement of turbine/generator arrangement 100'. Many of the components of the turbine/generator arrangement 100' in FIG. 10 correspond with those in the arrangement of FIG. 8 and are thus referenced with like reference numerals. Moreover, the turbine 1, mechanical gearbox 3, rotor 5 and stator windings 6 are identical to those of FIG. 8 and will not be described further. The switching control logic unit 9 also takes the same inputs (from the stator windings 6 and turbine shaft speed sensor 12) as in FIG. 8.

The electrical gearbox 150' of FIG. 10 is, however, different to the electrical gearbox 150 of FIG. 8. In particular, instead of an active power factor correction unit formed on a fixed capacitor, an inductance and a triac switching component, the reactance presented to the stator windings 6 is instead provided by one or more of a bank of switchable capacitors C1, C2, C3 . . . , collectively labelled in FIG. 10 as capacitors 15. These are switched by a first relay 7 under control of the control logic unit 9, along line 13. As with the electrical gearbox 150 of FIG. 8, however, the resistive load presented to the stator windings 6 is again provided by a switchable array of resistors 16 that are preferable immersed into the hot water tank of a domestic dwelling, for example, so as to allow direct heating of water from the turbine/generator arrangement 100'. These resistors 16 are switched via a second relay 8 which is controlled by the switching control logic unit 9 along line 14.

Thus in the arrangement of FIG. 10, the first part 200 of the electrical gearbox 150' presents, functionally, a switchable fixed-ratio gearbox and the second part 300 of the electrical gearbox 150' provides, functionally, a continuously variable electrical gearbox.

In operation, at a particular wind speed, an operating range of the turbine/generator arrangement 100' is selected by choosing a speed using the first part 200' of the electrical gearbox 150'. This is done by selecting a fixed capacitor load, from the various discrete capacitances available, that roughly lines the generator power/speed line (which is steep but not vertical) up with the maximum of the relevant turbine power/speed curve for the prevailing wind speed.

Then, the magnetic non-linearity is invoked to make the matching smoothly track the wind speed variation over a limited range surrounding (nominal) wind speed. This is achieved via the switching in and out of appropriate resistors in the array 16; accurately tracking the peak in the turbine power/speed curve involves selecting the size of the load conductance so as to modify the relationship between generator power throughput and magnetic core saturation and hence modify the magnetic-non-linearity-induced slope of the generator's power/speed characteristic so as to obtain the best possible tracking between the generator and the maxima of the turbine curves.

When the electrical gearbox 150' runs out of tracking range for whichever fixed capacitance is switched in at that time, the control logic unit 9 causes the relay 7 to select a different capacitor so as to allow control in an adjacent wind speed interval (band). Then, within that next speed interval or band, again the control logic unit 9 switches appropriate loads from the resistors 16 to track the peak in the turbine power/speed curve. It is for this reason that the operation of the electrical gearbox 150 may be likened to the discrete speed/switching of an automotive epicyclic gearbox between the fixed speeds, of which the fluid torque converter gives smooth continuous matching.

Although a good degree of flexibility may be provided by the presence of different capacitors and resistors of judiciously selected values, additional flexibility in engineering the generator power/speed line to improve matching may be afforded by arranging that the capacitative and resistive components may be switched to be in either series or in parallel. The arrangement of FIG. 10 shows the discrete capacitances and resistors in parallel, whereas FIG. 11, by contrast, shows a set of series switched capacitances and resistors in an electrical gearbox 150". Apart from the series connection between the capacitors 15 and resistors 16 of the electrical gearbox 150" in FIG. 11, all other components are identically arranged to those in FIG. 10 and are thus labelled with like reference numerals and will not be described again for brevity.

Figure 12:
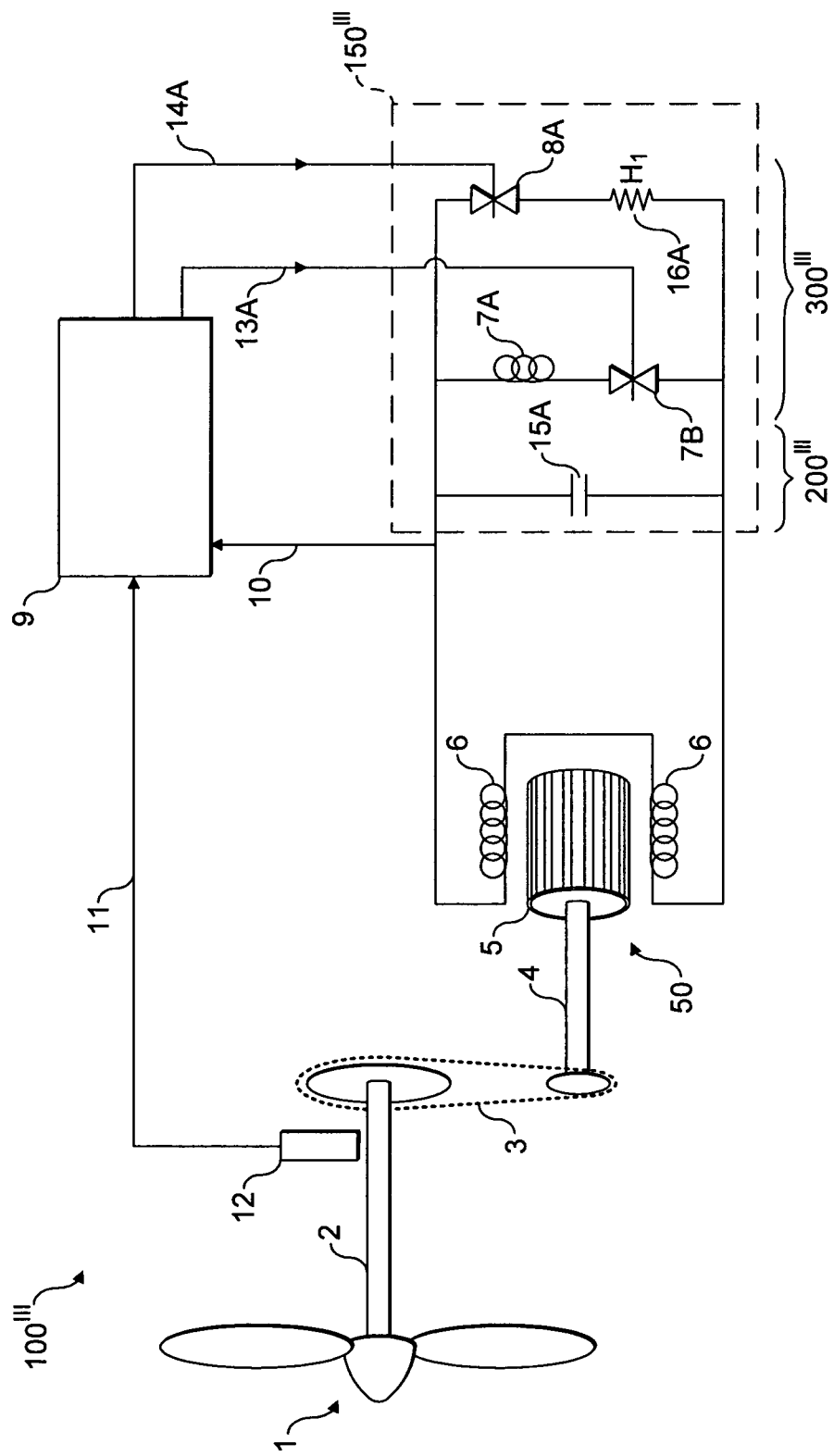
FIG. 12 shows in schematic form a first embodiment of a turbine/generator arrangement embodying the present invention.

FIG. 12 shows a further embodiment of a turbine/generator arrangement 100'''. Once again, the turbine, generator rotor and stator windings, together with the switching control logic unit 9 are arranged similarly to those in FIGS. 9, 10 and 11 and are thus labelled with like reference numerals and will not be described further. The electrical gearbox 150''' of FIG. 12, however, this time does not include any banks of capacitors or resistors. Instead, the reactance presented to the stator windings 6 is controlled using an active power factor correction unit forming a first part 200''' of the electrical gearbox 150''', in identical manner with that described in connection with FIG. 9 above. That is, a single, fixed capacitor 15A is provided in parallel with an inductance 7A and a triac switching component 7B under control of the switching control logic unit 9 along line 13A. A second part 300''' of the electrical gearbox 150''' is, however, provided by a single (fixed) resistance 16A in series with a second triac switching component 8A which is again under the control of the switching control logic unit 9 along line 14A. This again allows the control logic unit 9 to control the effective resistance of the load presented to the generator by the resistive heater element (resistor 16A). The electrical gearbox 150''' otherwise operates along the same principles as described above in terms of coarse and fine adjustment of the intersection point between the two power/speed curves.

Although FIGS. 8, 10, 11 and 12 show some examples of different combinations of fixed, switchable capacitors and resistors, and/or fixed capacitors/resistors in combination with triac switching, it will of course be understood that various alternative arrangements of electrical components can be employed to constitute the electrical gearbox. For example, in the arrangement of FIG. 8, the positions of the capacitor 15A and inductor 7A can be reversed. Other methods of controlling the reactive currents using electrical rather than mechanical components can also be contemplated. In general, it will be appreciated that triac control of a fixed capacitor and/or resistor permits tighter control of the intersection between the two power/speed curves (because the intersection is then continuously rather than discretely variable) but at the cost of a more complex and expensive controller.

Figure 20:
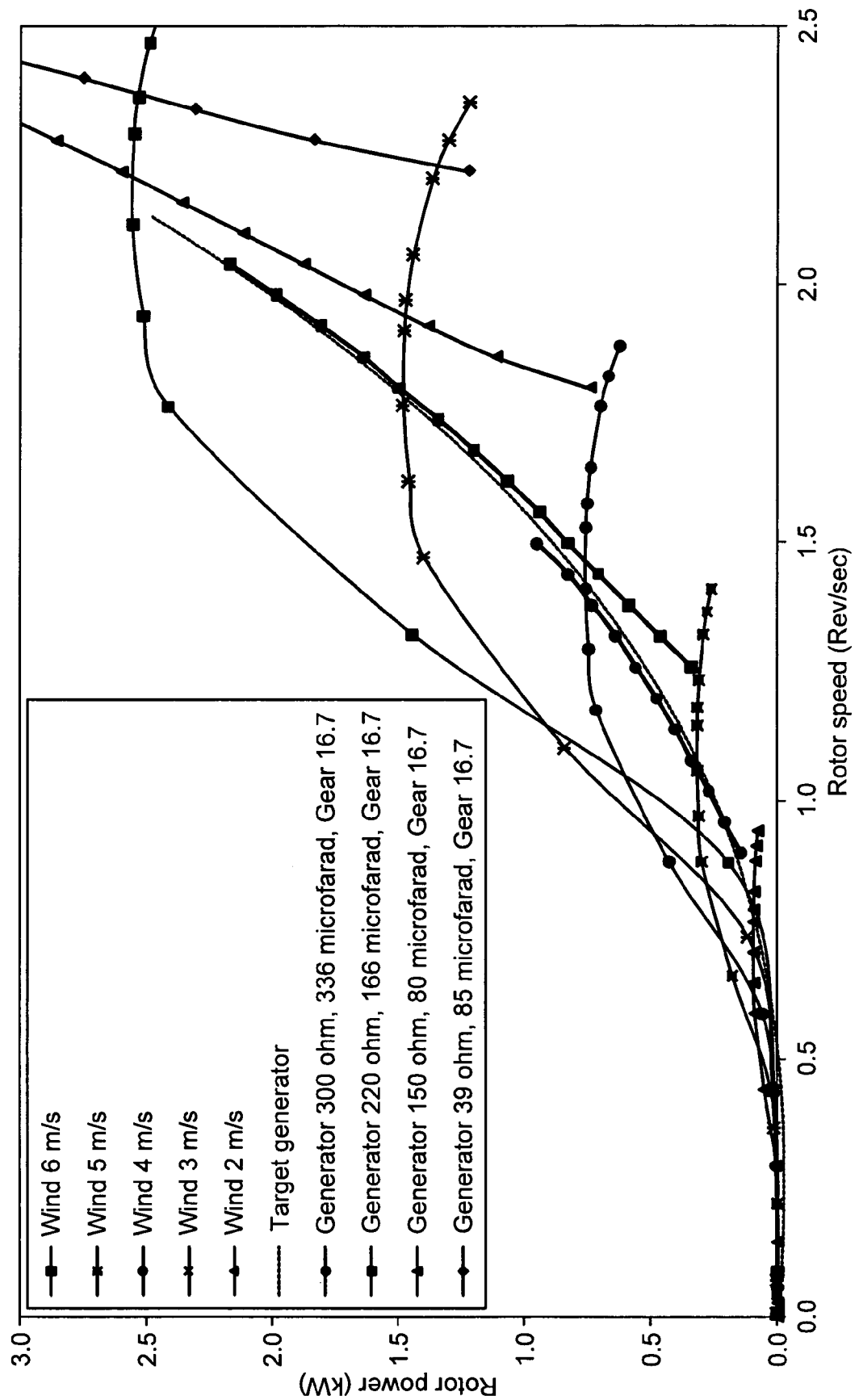
FIG. 20 shows a plot of rotor power against rotor speed for various wind speeds, in a practically realised implementation of a turbine/generator arrangement embodying the present invention.

FIG. 20 shows a plot of rotor power against rotor speed for various wind speeds, in a practically realised implementation of a turbine/generator arrangement embodying the present invention. The induction machine that was employed to provide the data for FIG. 20 is an ABB motor having parameters as defined in FIG. 14. This provides the induction generator. The associated prime mover is a three-bladed turbine of diameter 6 meters, supplied by Eircomposites. The figure of FIG. 20 shows a selection of working generator torque-speed curves (as can be seen, in a real induction generator, the generator power/speed relationship is not precisely linear) superimposed upon the torque/speed curves of the turbine. It will be noted that for the useful wind speed operating range of the turbine, which is between about 3 meters per second (providing a turbine power of approximately 300 Watts), and 10 meters per second (with a turbine power output of about 10 kWatts), the generator curves shown intersect the turbine curves close to their maximum power extraction points. The right hand generator power/speed curve in FIG. 20, with the diamond shaped data points, employs a fixed capacitance of 85 microfarads in series with a fixed resistance of 39 Ohm. The remaining generator curves use different fixed capacitances and resistors whose values are indicated in FIG. 20 and which, it may be noted, are arranged all in parallel.

The successive curves in FIG. 20 form a suitable complementary set as seen from the fact that they track maxima of the turbine power/speed curves. Switching between them is effected by the logic of the control logic unit 9 (FIGS. 8 to 12) using turbine speed as the switching criterion. Hysteresis is built into the logic switching decisions to prevent the system from hunting when operating near the boundaries between regimes.

It should be noted that the locus of the maxima of the turbine power/speed curves is a curve that is cubic in wind speed and hence in turbine frequency. This means it becomes steeper as wind speed rises. Thus, as the first part of the gearbox 200, 200', 200", 200''' switches range to faster speeds, the value of the parallel load resistor is progressively dropped in order to force the generator power/speed curve to be more vertical, thereby mirroring the behaviour of the locus of turbine maxima.

As another benefit, as the power rises, the resistive load drops, so that the system is steered away from voltage overload.

Although some preferred embodiments have been described, it will of course be understood that various modifications could be contemplated. For example, although FIGS. 8 to 12 each show the presence of an electrical gearbox under the control of a controller, so that the peak in the power output of the turbine/generator arrangement can be tracked over a wide range of wind speeds, it is to be reiterated that in a most general sense of the present invention this is not necessary. Selection of an appropriate fixed capacitance and load resistance still allows optimal generator power output to be achieved across an (admittedly narrower) range of wind speeds not least because of the relatively wide range of wind speeds over which the power output is at or near a maximum. In that case, of course, it is possible to do away completely with the need for a controller, and the sensors for monitoring turbine rotor speed and the voltage (or current) in the stator windings are also redundant. The cost saving needs to be weighed against the relatively restricted wind speed range over which the turbine/generator then operates optimally; whether this is acceptable will to an extent depend upon the wind climate at a proposed installation location.

Also, although separate relays are shown in FIG. 10, for example, to allow separate control of the specific capacitance and load resistance, as an alternative a single relay or other switch may be employed. In that case, the controller 9 causes the single relay to switch between different capacitance and resistance combinations.

Moreover although the context of the foregoing has been in the generation of power from wind, the same considerations apply equally to the generation of power from waves.

The invention claimed is:

1. An electrical generator comprising:
   a turbine;
   a core;
   a rotor, driveable by the turbine;
   a rotor speed sensor that measures a turbine rotation speed and that outputs a first signal that identifies a measured turbine rotation speed;
   a stator having stator windings, and
   an electrical circuit, connected to the stator windings and presenting a load impedance to the stator windings, wherein a real component of the load impedance presented to the stator windings includes one or more resistive elements and wherein a reactance of the impedance presented to the stator windings includes one or more capacitive elements; and
   a controller that includes a memory that includes a lookup table storing characteristics associated with at least a magnetization of the core and a flux density of the core,
   wherein the controller receives the first signal from the rotor speed sensor and receives a second signal from the stator, accesses the lookup table based on the first signal and the second signal, and determines a first output and a second output from the lookup table,
   wherein the controller controls the selection of the impedance of the electrical circuit based upon the first output and the second output so that the generator produces a generator output whose voltage and frequency varies with wind speed across a predetermined range of wind speeds, whilst a power output remains at or adjacent a peak power output of the generator across that predetermined wind speed range,
   wherein the controller selects, based on the first output, at least one of the one or more capacitive elements such that a power/speed line of the electrical generator is aligned at or near a maximum of a power/speed curve for a prevailing wind speed within the predetermined wind speed range, and
   wherein the controller switches, based on the second output, the one or more resistive elements to modify a magnetic-non-linearity-induced slope of the power/speed curve for the prevailing wind speed.

2. The electrical generator of claim 1, wherein the one or more resistive elements are resistive heater elements.

3. The electrical generator of claim 1, further comprising a mechanical gearbox between the turbine and the rotor.

4. The electrical generator of claim 1, wherein the rotor is of the squirrel cage type.

* * * * *